(12) United States Patent
Yamamoto et al.

(10) Patent No.: US 7,953,735 B2
(45) Date of Patent: May 31, 2011

(54) INFORMATION PROCESSING APPARATUS, METHOD AND PROGRAM

(75) Inventors: Noriyuki Yamamoto, Kanagawa (JP); Kei Tateno, Kanagawa (JP); Mari Saito, Kanagawa (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/660,313

(22) PCT Filed: Jun. 12, 2006

(86) PCT No.: PCT/JP2006/311742
§ 371 (c)(1),
(2), (4) Date: Mar. 5, 2008

(87) PCT Pub. No.: WO2006/134866
PCT Pub. Date: Dec. 21, 2006

(65) Prior Publication Data
US 2009/0043811 A1 Feb. 12, 2009

(30) Foreign Application Priority Data

Jun. 16, 2005 (JP) .................................. 2005-176519
May 31, 2006 (JP) .................................. 2006-151011

(51) Int. Cl.
*G06F 17/30* (2006.01)
(52) U.S. Cl. ........................................................ 707/736
(58) Field of Classification Search .................. None
See application file for complete search history.

(56) References Cited

U.S. PATENT DOCUMENTS

| 6,411,724 | B1 | 6/2002 | Vaithilingam et al. |
| 7,120,619 | B2 | 10/2006 | Drucker et al. |
| 7,162,482 | B1 * | 1/2007 | Dunning .................... 707/102 |
| 7,194,527 | B2 | 3/2007 | Drucker et al. |
| 2002/0072895 | A1 * | 6/2002 | Imanaka et al. ................. 704/9 |
| 2002/0159640 | A1 | 10/2002 | Vaithilingam et al. |
| 2003/0195863 | A1 * | 10/2003 | Marsh ............................... 707/1 |
| 2003/0233460 | A1 | 12/2003 | Drucker et al. |

(Continued)

FOREIGN PATENT DOCUMENTS

JP 2004-35340 2/2004

(Continued)

*Primary Examiner* — Charles Rones
*Assistant Examiner* — Yuk Ting Choi
(74) *Attorney, Agent, or Firm* — Finnegan, Henderson, Farabow, Garrett & Dunner, L.L.P.

(57) ABSTRACT

The present invention relates to an information processing apparatus, an information processing method, and a program in which a content piece matching preference information of a user or a content piece similar to a specified content piece can be searched for with a smaller amount of computation and can be provided to the user. Each of items of metadata (such as title, artist name, genre, review text, tempo, beat, and rhythm) of music is classified into any of cluster layers (first to n-th layers), and is classified (clustering) into a plurality of clusters provided in the cluster layers into which actual information of each of the items is classified. Then, instead of the metadata, cluster information including cluster IDs (such as CL11 in FIG. 2) of the clusters into which actual information of each of the items of metadata is classified is compiled in a database as information indicating the features of music. The present invention can be applied to a homepage server for recommending a purchase of content such as music data, a video recorder for recommending a recording reservation of a television program, and the like.

10 Claims, 34 Drawing Sheets

U.S. PATENT DOCUMENTS

| | | |
|---|---|---|
| 2004/0073918 A1* | 4/2004 | Ferman et al. .................. 725/34 |
| 2004/0215657 A1 | 10/2004 | Drucker et al. |
| 2005/0240580 A1* | 10/2005 | Zamir et al. ...................... 707/4 |
| 2006/0036640 A1* | 2/2006 | Tateno et al. .................. 707/102 |
| 2006/0047678 A1 | 3/2006 | Miyazaki et al. |
| 2007/0033220 A1 | 2/2007 | Drucker et al. |
| 2007/0078845 A1* | 4/2007 | Scott et al. ........................ 707/5 |
| 2007/0083818 A1 | 4/2007 | Drucker et al. |

FOREIGN PATENT DOCUMENTS

| | | |
|---|---|---|
| JP | 2004-117587 | 4/2004 |
| JP | 2004-194107 | 7/2004 |
| JP | 2004-206679 | 7/2004 |
| JP | 2005078245 A * | 3/2005 |
| WO | WO 01/03002 A2 | 1/2001 |
| WO | WO 2005/038666 A1 | 4/2005 |

* cited by examiner

FIG. 3

| MUSIC ID | FIRST LAYER | SECOND LAYER | THIRD LAYER | FOURTH LAYER | FIFTH LAYER | ... | n-TH LAYER |
|---|---|---|---|---|---|---|---|
| ABC123 | CL12 | CL21 | CL35 | CL47 | CL52 | ... | CLn2 |
| CTH863 | CL11 | CL25 | CL31 | CL42 | CL53 | ... | CLn1 |
| XYZ567 | CL12 | CL24 | CL32 | CL41 | CL54 | ... | CLn4 |
| ... | | | | | | | |

FIG. 4

| | CLi1 | CLi2 | CLi3 | CLi4 | CLi5 | CLi6 |
|---|---|---|---|---|---|---|
| | | | CLUSTER/MUSIC ID | | | |
| FIRST LAYER | CTH863 | ABC123 XYZ567 | | | | CLi6 |
| SECOND LAYER | ABC123 | | | XYZ567 | CTH863 | |
| THIRD LAYER | CTH863 | XYZ567 | | | ABC123 | |
| FOURTH LAYER | XYZ567 | CTH863 | | | | |
| FIFTH LAYER | | ABC123 | CTH863 | XYZ567 | | |

FIG. 5

| | PREFERENCE INFORMATION | | | | | |
|---|---|---|---|---|---|---|
| | CLi1 | CLi2 | CLi3 | CLi4 | CLi5 | CLi6 |
| FIRST LAYER | 0.5 | 0 | 0.3 | 0 | 0 | 0 |
| SECOND LAYER | 0 | 0.1 | 0.5 | 0.1 | 0 | 0 |
| THIRD LAYER | 0.3 | 0.1 | 0.1 | 0.1 | 0 | 0.3 |
| FOURTH LAYER | 0.1 | 0.4 | 0.3 | 0 | 0.3 | 0.1 |
| FIFTH LAYER | 0.1 | 0.2 | 0.2 | 0.2 | 0.1 | 0 |

FIG. 6

| | FIRST TECHNIQUE | SECOND TECHNIQUE | THIRD TECHNIQUE | FOURTH TECHNIQUE |
|---|---|---|---|---|
| ARTIST A | CL1 | CL1 | CL1 | CL3 |
| ARTIST B | CL1 | CL1 | CL2 | CL3 |
| ARTIST C | CL1 | CL2 | CL3 | CL3 |
| ARTIST D | CL2 | CL2 | CL1 | CL1 |
| ARTIST E | CL2 | CL2 | CL2 | CL2 |
| ARTIST F | CL2 | CL3 | CL3 | CL2 |
| ARTIST G | CL2 | CL3 | CL1 | CL2 |
| ARTIST H | CL3 | CL3 | CL2 | CL3 |
| ARTIST I | CL3 | CL3 | CL3 | CL1 |
| ARTIST J | CL3 | CL3 | CL1 | CL1 |

FIG. 7

| | FIRST TECHNIQUE | SECOND TECHNIQUE | THIRD TECHNIQUE | FOURTH TECHNIQUE |
|---|---|---|---|---|
| FIRST TECHNIQUE | - | | | |
| SECOND TECHNIQUE | 0.8 | - | | - |
| THIRD TECHNIQUE | 0.3 | 0.3 | - | - |
| FOURTH TECHNIQUE | 0.4 | 0.3 | 0.4 | - |

FIG. 8

| | ARTIST A | ARTIST B | ARTIST C | ARTIST D | ARTIST E | ARTIST F | ARTIST G | ARTIST H | ARTIST I | ARTIST J |
|---|---|---|---|---|---|---|---|---|---|---|
| ARTIST A | - | - | - | - | - | - | - | - | - | - |
| ARTIST B | 1 | - | - | - | - | - | - | - | - | - |
| ARTIST C | 1 | 1 | - | - | - | - | - | - | - | - |
| ARTIST D | 0 | 1 | 0 | - | - | - | - | - | - | - |
| ARTIST E | 0 | 1 | 1 | 0 | - | - | - | - | - | - |
| ARTIST F | 1 | 0 | 0 | 1 | 1 | - | - | - | - | - |
| ARTIST G | 0 | 0 | 1 | 0 | 1 | 0 | - | - | - | - |
| ARTIST H | 1 | 0 | 0 | 0 | 0 | 0 | 1 | - | - | - |
| ARTIST I | 1 | 0 | 0 | 1 | 0 | 1 | 0 | 1 | - | - |
| ARTIST J | 0 | 1 | 1 | 0 | 0 | 0 | 0 | 0 | 0 | - |

FIG. 9

|  | CORRECT ANSWER RATE |
|---|---|
| FIRST TECHNIQUE | 62.2% |
| SECOND TECHNIQUE | 55.6% |
| THIRD TECHNIQUE | 40.0% |
| FOURTH TECHNIQUE | 66.7% |

FIG. 10

|  | FIRST TECHNIQUE | SECOND TECHNIQUE | THIRD TECHNIQUE | FOURTH TECHNIQUE |
|---|---|---|---|---|
| FIRST TECHNIQUE | - | - | - | - |
| SECOND TECHNIQUE | 46.7% | - | - | - |
| THIRD TECHNIQUE | 26.7% | 24.4% | - | - |
| FOURTH TECHNIQUE | 53.3% | 40.0% | 31.1% | - |

FIG. 19

| MUSIC ID | FIRST LAYER | | | SECOND LAYER | | | THIRD LAYER | | | ... | n-TH LAYER | | |
|---|---|---|---|---|---|---|---|---|---|---|---|---|---|
| ABC123 | 0 | 0.8 | 0 | 0.2 | 0.4 | 0.6 | 0 | 0 | 0 | 1 | 1 | 0 | 0 |
| CTH863 | 1 | 0 | 0 | 0 | 0 | 0.5 | 0.5 | 0.7 | 0.3 | 0 | 0 | 0.8 | 0.2 |
| XYZ567 | 0 | 0.4 | 0.6 | 0 | 0 | 0 | 0 | 0.9 | 0 | 0.1 | 0.3 | 0 | 0.7 |
| ... | | | | | | | | | | | | | |

FIG. 20

| MUSIC ID | META-GROUP 1 | | | META-GROUP 2 | | | ... |
| --- | --- | --- | --- | --- | --- | --- | --- |
| | METADATA 1 | METADATA 2 | METADATA 3 | METADATA 4 | METADATA 5 | METADATA 6 | |
| ABC123 | 1 | 1 | 1 | 1 | 1 | 1 | |
| CTH863 | 0 | 1 | 0 | 0 | 1 | 1 | |
| XYZ567 | 1 | 1 | 1 | 1 | 1 | 1 | |
| EKF534 | 1 | 0 | 1 | 0 | 0 | 1 | |
| OPQ385 | 1 | 0 | 1 | 1 | 0 | 0 | |
| ... | | | | | | | |

FIG. 21

| MUSIC ID | FIRST LAYER | | | | SECOND LAYER | | | |
|---|---|---|---|---|---|---|---|---|
| | METADATA 1 | METADATA 2 | METADATA 3 | METADATA 4 | METADATA 2 | METADATA 5 | METADATA 6 | ... |
| ABC123 | 1 | | 1 | 1 | 1 | 1 | 1 | |
| CTH863 | 0 | | 0 | 0 | 1 | 1 | 1 | |
| XYZ567 | 1 | | 1 | 1 | 1 | 1 | 1 | |
| EKF534 | 1 | | 1 | 0 | 0 | 0 | 1 | |
| OPQ385 | 1 | | 1 | 1 | 0 | 0 | 0 | |
| ... | | | | | | | | |

FIG. 23

| MUSIC ID | FIRST LAYER | | | | SECOND LAYER | | | | THIRD LAYER | | | | FOURTH LAYER | | | |
|---|---|---|---|---|---|---|---|---|---|---|---|---|---|---|---|---|
| | CL11 | CL12 | CL13 | CL14 | CL21 | CL22 | CL23 | CL24 | CL31 | CL32 | CL33 | CL41 | CL42 | CL43 | CL44 |
| ABC123 | 0 | 1 | 0 | 0.2 | 0.6 | 0.8 | 0 | 0 | 0 | 0 | 1 | 1 | 0 | 0 | 0 |
| CTH863 | 1 | 0 | 0 | 0 | 0 | 0.7 | 0.7 | 0 | 0.9 | 0.4 | 0 | 0 | 1 | 0.3 | 0 |
| XYZ567 | 0 | 0.6 | 0.8 | 0 | 0 | 0 | 0 | 1 | 1 | 0 | 0.1 | 0.5 | 0 | 0 | 0.9 |
| EKF534 | 0.9 | 0 | 0 | 0.5 | 0 | 0.6 | 0 | 0.8 | 0.7 | 0 | 0.7 | 0 | 0.9 | 0.4 | 0.3 |
| OPQ385 | 0.7 | 0.2 | 0.6 | 0 | 1 | 0 | 0 | 0 | 0 | 1 | 0 | 0.4 | 0.9 | 0 | 0 |

FIG. 24

| MUSIC ID | SIMILARITY LEVEL |
|---|---|
| CTH863 | 0.57 |
| XYZ567 | 1.18 |
| EKF534 | 1.27 |
| OPQ385 | 1.20 |

FIG. 27

| USER ID | FIRST LAYER | | | | SECOND LAYER | | | | THIRD LAYER | | | FOURTH LAYER | | | |
|---|---|---|---|---|---|---|---|---|---|---|---|---|---|---|---|
| | CL11 | CL12 | CL13 | CL14 | CL21 | CL22 | CL23 | CL24 | CL31 | CL32 | CL33 | CL41 | CL42 | CL43 | CL44 |
| U001 | 0 | 0.8 | 0 | 0.6 | 0.4 | 0.6 | 0.7 | 0 | 0.7 | 0.5 | 0.5 | 0 | 0.5 | 0.4 | 0 |

FIG. 28

| MUSIC ID | FIRST LAYER | | | | SECOND LAYER | | | | THIRD LAYER | | | | FOURTH LAYER | | | |
|---|---|---|---|---|---|---|---|---|---|---|---|---|---|---|---|---|
| | CL11 | CL12 | CL13 | CL14 | CL21 | CL22 | CL23 | CL24 | CL31 | CL32 | CL33 | CL41 | CL42 | CL43 | CL44 |
| ABC123 | 0 | 1 | 0 | 0.2 | 0.6 | 0.8 | 0 | 0 | 0 | 0 | 1 | 1 | 0 | 0 | 0 |
| CTH863 | 1 | 0 | 0 | 0 | 0 | 0.7 | 0.7 | 0 | 0.9 | 0.4 | 0 | 0 | 1.1 | 0.3 | 0 |
| XYZ567 | 0 | 0.6 | 0.8 | 0 | 0 | 0 | 0 | 1 | 1 | 0 | 0.1 | 0.4 | 0 | 0 | 0.7 |

FIG. 29

| MUSIC ID | FIRST LAYER | SECOND LAYER | THIRD LAYER | FOURTH LAYER | SUM FOR ALL LAYERS |
|---|---|---|---|---|---|
| ABC123 | 0.91 | 0.67 | 0.53 | 0.00 | 2.11 |
| CTH863 | 0.00 | 0.92 | 0.82 | 0.63 | 2.37 |
| XYZ567 | 0.44 | 0.00 | 0.72 | 0.00 | 1.15 |

FIG. 30

| USER ID | FIRST LAYER | SECOND LAYER | THIRD LAYER | FOURTH LAYER |
|---------|-------------|--------------|-------------|--------------|
| U001 | 0.17 | 0.10 | 0.01 | 0.06 |

FIG. 31

| MUSIC ID | FIRST LAYER | SECOND LAYER | THIRD LAYER | FOURTH LAYER | SUM FOR ALL LAYERS |
|---|---|---|---|---|---|
| ABC123 | 1.27 | 0.49 | 0.03 | 0.00 | 1.79 |
| CTH863 | 0.00 | 0.65 | 0.04 | 0.27 | 0.96 |
| XYZ567 | 0.53 | 0.00 | 0.04 | 0.00 | 0.57 |

FIG. 33

| USER ID | FIRST LAYER | | | | SECOND LAYER | | | | THIRD LAYER | | | | FOURTH LAYER | | | |
|---|---|---|---|---|---|---|---|---|---|---|---|---|---|---|---|---|
| | CL11 | CL12 | CL13 | CL14 | CL21 | CL22 | CL23 | CL24 | CL31 | CL32 | CL33 | | CL41 | CL42 | CL43 | CL44 |
| U001 | 0 | 0.8 | 0 | 0.6 | 0 | 0.6 | 0.7 | 0 | 0.7 | 0 | 0 | | 0 | 0 | 0 | 0 |

FIG. 34

| MUSIC ID | FIRST LAYER | SECOND LAYER | THIRD LAYER | FOURTH LAYER | TOTAL |
|---|---|---|---|---|---|
| ABC123 | 0.15 | 0.05 | 0.00 | 0.00 | 0.20 |
| CTH863 | 0.00 | 0.10 | 0.00 | 0.00 | 0.10 |
| XYZ567 | 0.07 | 0.00 | 0.00 | 0.00 | 0.08 |

INFORMATION PROCESSING APPARATUS, METHOD AND PROGRAM

FIELD OF THE INVENTION

The present invention relates to information processing apparatuses, information processing methods, and programs. More specifically, the present invention relates to an information processing apparatus, an information processing method, and a program configured to classify content pieces into clusters and to manage the features of the content pieces using the clusters into which the content pieces are classified so that the features can be used for content search or recommendation.

BACKGROUND OF THE INVENTION

There have been proposed inventions for searching for content such as television programs and music pieces on the basis of the preferences of users and recommending the content to the users (so-called content personalization) (see, for example, Patent Document 1).

A technique called content-based filtering (CBF) is widely used for the content personalization. In the CBF technique, metadata assigned in advance to content pieces by distributors or sellers is directly used for extraction of preferences or content recommendation. For example, when the content pieces are music pieces, each of the music pieces is assigned in advance metadata such as the title, the artist name, the genre, and the review text. In addition to the information assigned in advance, in some cases, the tempo, rhythm, and the like of the music pieces are detected for additional metadata.

Preference information of a user is generated by using metadata of music pieces as feature vectors and summing the feature vectors of the music pieces according to operations (such as reproduction, recording, skipping, and deletion) performed by the user for the music pieces. For example, the feature vector of a reproduced music piece is multiplied by one, the feature vector of a recorded music piece is multiplied by two, the feature vector of a skipped music piece is multiplied by minus one, and the feature vector of a deleted music piece is multiplied by minus two, before the feature vectors are summed.

When a music piece matching the preferences of the user is to be recommended, a distance (such as cosine correlation) between the feature vector indicating the preferences of the user and the feature vector of each of candidate music pieces is determined, and the music piece for which the determined distance is short is recommended as the music piece matching the preferences of the user.

CROSS REFERENCE TO RELATED APPLICATION

This application is a national phase application based on PCT/JP2006/311742, filed Jun. 12, 2006, the content of which is incorporated herein by reference.

[Patent Document 1] Japanese Unexamined Patent Application Publication No. 2004-194107

SUMMARY OF THE INVENTION

However, when the preference information of the user is generated as described above by summing the preference vectors of the music pieces, the characteristics of the preferences are buried, that is, a so-called rounding problem caused by the summation of the preferences occurs. Thus, a music piece that does not match the preferences of the user may be recommended.

For example, the user has a preference for up-tempo highly rhythmic rock music and also has a preference for slow-tempo slow-beat jazz music. In this case, the two preferences are summed, resulting in preferences for both up-tempo and slow-tempo, both highly rhythmic and slow-beat, and both rock music and jazz music. Thus, there is a possibility that an up-tempo jazz music piece, which does not match the preferences of the user, would be recommended.

Further, in general, each of items of metadata of music pieces, which can be represented by a numerical value, is nominally scaled and is used as a feature vector element. In this case, there arises another problem in that two values with a threshold value for the nominal scaling therebetween may be converted into different values, and the relationship between the two values in which the values before the conversion are numerically close to each other may be lost.

It is also desirable to reduce the amount of calculation for calculating the distance between the feature vector indicating the preferences of the user and the feature vector of each of candidate music pieces.

The present invention has been made in view of such circumstances, and is intended to allow a content piece matching preference information of a user or a content piece similar to a specified content piece to be searched for with a smaller amount of computation and to be provided to the user.

BRIEF SUMMARY OF THE INVENTION

An information processing apparatus according to an aspect of the present invention is an information processing apparatus for selecting a content piece satisfying a predetermined condition from a content group, including content classifying means for classifying each of content pieces constituting the content group into any of a plurality of first clusters in each of layers associated with metadata of the content pieces; holding means for holding a database indicating correspondences between the content pieces and the first clusters in the layers into which the content pieces are classified; specifying means for specifying a first cluster corresponding to the predetermined condition for each of the layers from among the first clusters and specifying a content piece corresponding to the specified first cluster from among the content pieces; and providing means for providing the content piece specified by the specifying means.

The information processing apparatus can further include storing means for storing a preference value indicating a degree of preference of a user in association with each of the first clusters into which the content pieces are classified by the content classifying means. The specifying means can specify a first cluster from among the first clusters on the basis of the preference values stored by the storing means, and can specify a content piece corresponding to the specified first cluster from among the content pieces.

The specifying means can further specify from among the content pieces a content piece corresponding to the specified first cluster using an evaluation value indicating a degree of preference of the user with a weight for each of the layers in accordance with the preference value.

The information processing apparatus can further include setting means for setting a keyword for the first clusters into which the content pieces are classified by the content specifying means; and generating means for generating a reason statement indicating the reason for providing the content piece using the keyword set by the setting means. The providing means can further provide the reason statement.

The content pieces can be music pieces, and the metadata can include at least one of tempo, beat, and rhythm of the music pieces.

The metadata can include review text for the corresponding content pieces.

The information processing apparatus can further include metadata classifying means for classifying the metadata of the content pieces into any of a plurality of second clusters, and allocating the layers to the second clusters, and the content classifying means can classify each of the content pieces into any of the plurality of first clusters for each of the allocated layers.

The specifying means can further specify a content piece using a similarity level indicating a degree of similarity to a similarity-reference content piece from among content pieces corresponding to a first cluster among the first clusters into which the similarity-reference content piece is classified.

The specifying means can specify a content piece using the similarity level that is weighted by a weight for each of the layers in accordance with a belonging weight of the similarity-reference content piece for the first cluster.

An information processing method according to an aspect of the present invention is an information processing method for an information processing apparatus for selecting a content piece satisfying a predetermined condition from a content group, including a classifying step of classifying each of content pieces constituting the content group into any of a plurality of clusters in each of layers associated with metadata of the content pieces; a holding step of holding a database indicating correspondences between the content pieces and the clusters in the layers into which the content pieces are classified; a specifying step of specifying a cluster corresponding to the predetermined condition for each of the layers from among the clusters and specifying a content piece corresponding to the specified cluster from among the content pieces; and a providing step of providing the specified content piece.

A program according to an aspect of the present invention is a program for selecting a content piece satisfying a predetermined condition from a content group, the program causing a computer to execute a process including a classifying step of classifying each of content pieces constituting the content group into any of a plurality of clusters in each of layers associated with metadata of the content pieces; a holding step of holding a database indicating correspondences between the content pieces and the clusters in the layers into which the content pieces are classified; a specifying step of specifying a cluster corresponding to the predetermined condition for each of the layers from among the clusters and specifying a content piece corresponding to the specified cluster from among the content pieces; and a providing step of providing the specified content piece.

In an aspect of the present invention, each of content pieces constituting a content group is classified into any of a plurality of clusters in each of layers associated with metadata of the content pieces; a database indicating correspondences between the content pieces and the clusters in the layers into which the content pieces are classified is held; a cluster corresponding to the predetermined condition is specified for each of the layers from among the clusters and a content piece corresponding to the specified cluster is specified from among the content pieces; and the specified content piece is provided.

Advantages

According to the present invention, a content piece matching preference information of a user or a content piece similar to a specified content piece can be searched for with a smaller amount of computation, and can be provided to the user.

BRIEF DESCRIPTION OF THE DRAWINGS

FIG. 3 is a diagram showing an example of cluster information.

FIG. 4 is a diagram showing an example of cluster/music ID information.

FIG. 5 is a diagram showing an example of preference information.

FIG. 6 is a diagram showing a method for selecting two techniques from among first to fourth clustering techniques.

FIG. 7 is a diagram showing a method for selecting two techniques from among the first to fourth clustering techniques.

FIG. 8 is a diagram showing a method for selecting two techniques from among the first to fourth clustering techniques.

FIG. 9 is a diagram showing a method for selecting two techniques from among the first to fourth clustering techniques.

FIG. 10 is a diagram showing a method for selecting two techniques from among the first to fourth clustering techniques.

FIG. 19 is a diagram showing an example of metadata of each of music pieces subjected to soft-clustering.

FIG. 20 is a diagram showing an example of metadata of each of music pieces.

FIG. 21 is a diagram showing an example of cluster information.

FIG. 23 is a diagram showing an example of cluster information.

FIG. 24 is a diagram showing an example of similarity levels.

FIG. 27 is a diagram showing an example of preference values.

FIG. 28 is a diagram showing an example of cluster information.

FIG. 29 is a diagram showing an example of similarity levels.

FIG. 30 is a diagram showing an example of weights.

FIG. 31 is a diagram showing an example of similarity levels.

FIG. 33 is a diagram showing an example of preference values.

FIG. 34 is a diagram showing an example of similarity levels.

Figure 1:
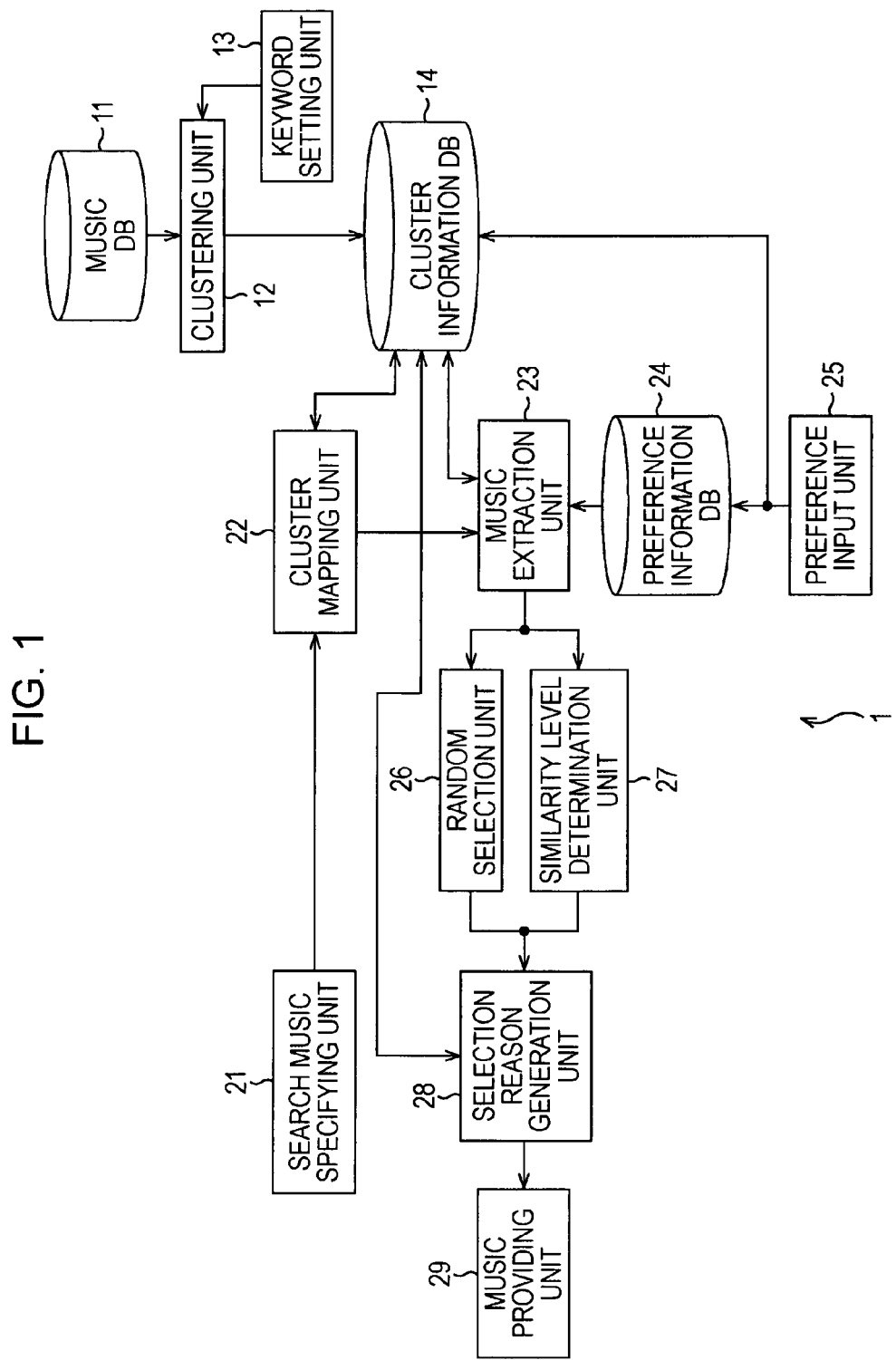
FIG. 1 is a block diagram showing an example structure of a recommendation system to which the present invention is applied.

REFERENCE NUMERALS 1 recommendation system
11 music database
12 clustering unit
13 keyword setting unit
14 cluster information database
21 search music specifying unit
22 cluster mapping unit
23 music extraction unit
24 preference information database
25 preference input unit
26 random selection unit
27 similarity level determination unit
28 selection reason generation unit
29 music providing unit
201 metadata clustering unit
202 music clustering unit

DETAILED DESCRIPTION OF THE INVENTION

Specific embodiments to which the present invention is applied will be described in detail with reference to the drawings.

FIG. 1 shows an example structure of a recommendation system according to an embodiment of the present invention. The recommendation system 1 is configured to search for a music piece matching the preferences of a user or a music piece similar to a music piece specified by the user and to provide the searched music piece to the user. The recommendation system 1 can also be used for recommendation of content other than music, such as television programs, movies, and books.

The recommendation system 1 includes a music database (DB) 11 having recorded thereon metadata of a large number of music pieces to be searched, a clustering unit 12 that performs clustering on each of the music pieces recorded on the music database 11 on the basis of the metadata of the music pieces to generate cluster information for each of the music pieces, a keyword setting unit 13 that sets keywords individually indicating the features of cluster layers and clusters, and a cluster information database (DB) 14 holding the cluster information for each of the music pieces.

The recommendation system 1 further includes a search music specifying unit 21 that specifies a music piece as a similarity reference (hereinafter referred to as a "reference music piece") to which a music piece to be searched for is similar, a cluster mapping unit 22 that maps metadata of the reference music piece to an optimum cluster using a generally-available cluster identification technique (classification technique), a music extraction unit 23 that extracts one or more music pieces to be provided to the user, a preference information database (DB) 24 having recorded thereon preference information indicating the preferences of the user, a preference input unit 25 that inputs the preferences of the user, a random selection unit 26 that randomly selects one music piece from among the extracted music pieces, a similarity level determination unit 27 that determines a similarity level between the extracted music pieces and the reference music piece or the preferences of the user to select a music piece having the highest similarity level, a selection reason generation unit 28 that generates a selection reason statement indicating the reason for selection performed by the random selection unit 26 or the similarity level determination unit 27, and a music providing unit 29 that provides the user with the selected music piece and the selection reason statement.

The music database (DB) 11 corresponds to a data server on the Internet for supplying metadata of music tracks recorded on music CDs, such as CDDB (CD Data Base) or Music Navi.

Figure 2:
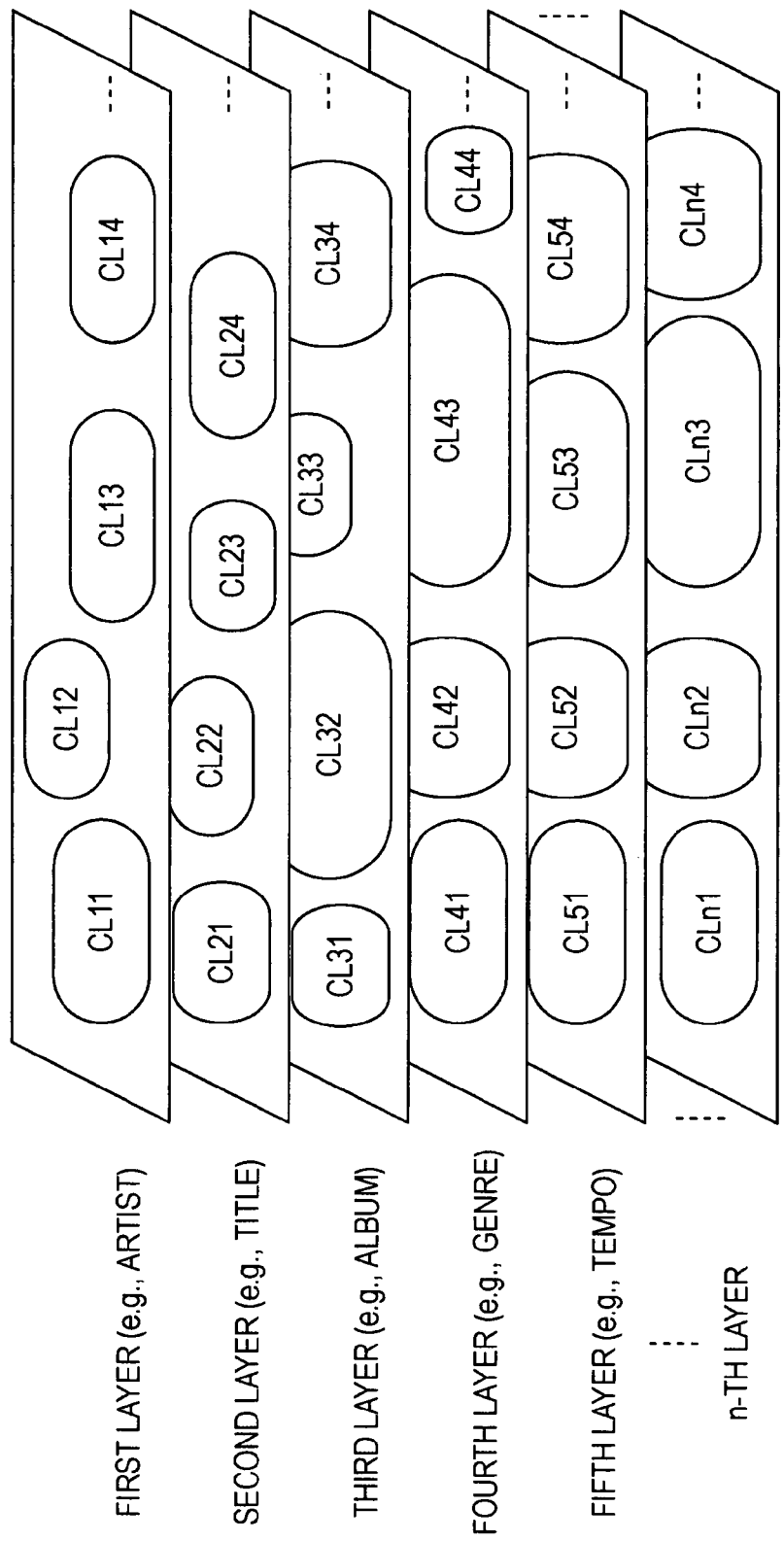
FIG. 2 is a diagram showing the concept of clusters for classifying metadata and cluster layers.

The clustering unit 12 classifies each of items of music metadata (such as title, artist name, genre, review text, tempo, beat, or rhythm) for all music pieces of the music database 11 into any of cluster layers (first to n-th layers) shown in FIG. 2, and classifies (clustering) each of the music pieces into any of a plurality of clusters provided in the cluster layers into which actual information of each of the items is classified.

One music piece may be classified into a plurality of clusters. It is assumed that the distance (indicating the degree of similarity) between clusters located in the same cluster layer is known. The clustering technique is discussed below. The clustering unit 12 generates, instead of the metadata, as information indicating the features of the music pieces, cluster information including cluster IDs (such as CL11 shown in FIG. 2) of the clusters into which actual information of each of the items of metadata is classified, and outputs the cluster information to the cluster information database 14.

If there is no optimum cluster for classification, a new cluster may be produced. Each of the clusters may have any size sufficient to contain a plurality of music pieces. A cluster capable of classifying only one music piece may be provided. In this case, an ID (artist ID, album ID, or title ID) of actual information of the only one classifiable music piece may be used as the cluster ID of that cluster.

The cluster information database 14 holds cluster information of the music pieces that is generated by the clustering unit 12. Further, the cluster information database 14 generates cluster/music ID information indicating music IDs of the music pieces for which the metadata is classified into the clusters on the basis of the held cluster information, and holds the cluster/music ID information. The cluster information database 14 also holds the keywords set by the keyword setting unit 13 for the cluster layers and the clusters.

FIG. 3 shows an example of the cluster information. In FIG. 3, for example, cluster information of a music piece with music ID=ABC123 includes (CL12, CL21, CL35, CL47, CL52, . . . , CLn2). As is further illustrated, for example, cluster information of a music piece with music ID=CTH863 includes cluster IDs (CL11, CL25, CL31, CL42, CL53, CLn1).

FIG. 4 shows an example of the cluster/music ID information corresponding to the cluster information shown in FIG. 3. In FIG. 4, for example, music ID=CTH863 corresponds to cluster ID=CL11. Further, for example, music ID=ABC123 corresponds to cluster ID=CL21.

It is necessary to perform the operation of the clustering unit 12, the keyword setting unit 13, and the cluster information database 14 in advance prior to a similar-music search process or a music recommendation process (discussed below).

The reader is referred back to FIG. 1. The search music specifying unit 21 outputs the music ID and metadata of the reference music piece specified by the user to the cluster mapping unit 22. The cluster mapping unit 22 selects an optimum cluster for the metadata of the reference music piece input from the search music specifying unit 21 using an existing cluster identification technique (classification technique). A k-Nearest-Neighbor method or the like can be used as the cluster identification technique. If the cluster information of the reference music piece has been already present in the cluster information database 14, it may be read and supplied to the music extraction unit 23.

The music extraction unit 23 refers to the cluster information database 14 on the basis of the cluster information of the reference music piece supplied from the cluster mapping unit 22 to obtain a music ID of a music piece classified in the same cluster as that of the reference music piece, and supplies the music ID to the random selection unit 26 or the similarity level determination unit 27. Also, the music extraction unit 23 refers to the cluster information database 14 on the basis of the preference information of the preference information database 24 to obtain a music ID of a music piece matching the preferences of the user, and supplies the music ID to the random selection unit 26 or the similarity level determination unit 27.

The preference information database 24 has recorded thereon preference information indicating the preferences of the user. The preference information includes a preference value indicating a degree of preference for the user with respect to each of the clusters. The preference value is a normalized value, and is updated by the preference input unit 25. The preference information database 24 further calculates a distribution of the preference values in each of the cluster layers, and detects a cluster layer with the lowest distribution of the preference values (that is, a cluster layer in which the preferences of the user are concentrated in a particular cluster).

FIG. 5 shows an example of the preference information. In FIG. 5, for example, the preference value corresponding to the cluster CL11 is 0.5. Further, for example, the preference value corresponding to the cluster CL32 is 0.1.

The preference input unit 25 updates the corresponding preference values for the clusters on the basis of records of operations (such as reproduction, recording, skipping, and deletion) performed by the user for the music pieces. The preference input unit 25 further notifies the cluster information database 14 of a cluster layer interested by the user according to the settings made by the user.

The random selection unit 26 randomly selects one music ID from among the music pieces extracted by the music extraction unit 23, and outputs the music ID to the selection reason generation unit 28. The similarity level determination unit 27 determines a similarity level between the music piece extracted by the music extraction unit 23 and the reference music piece or the preferences of the user to select a music piece having the highest similarity level, and outputs the music piece to the selection reason generation unit 28. Both the random selection unit 26 and the similarity level determination unit 27 may not necessarily operate, that is, either may operate.

The selection reason generation unit 28 obtains the keywords corresponding to the cluster layers or the clusters from the cluster information database 14, generates a selection reason statement indicating the reason for selection using the obtained keywords and the like, and outputs the selection reason statement together with the music ID of the selected music piece to the music providing unit 29.

The selection reason statement is generated in the following way. For example, the keyword set for the cluster layer or the keyword of the cluster that is given higher priority to select a similar music piece or a music piece matching the preferences is used. Specifically, in a case where the cluster layer corresponding to the review text is given the highest priority, a statement of the reason for selection, such as "the 'summer' and 'seaside' appearing in the review text are favorites, aren't they?", is generated. Alternatively, the review text of a selected music piece is quoted as a statement of the reason for selection, or a statement of the reason for selection is generated using words extracted from the review text of a selected music piece. The Tf/idf method may be used to extract words to be used for a statement of the reason for selection from review text.

The music providing unit 29 is formed of, for example, a display or the like, and provides the user with the music piece of the music ID and the selection reason statement that are input from the selection reason generation unit 28.

Next, the classification (clustering) of metadata by the clustering unit 12 will be described.

Although any clustering technique may be used, a clustering technique and a distance measure that are optimum for each of the cluster layers are selected. For example, if actual information of metadata is a numerical value, the value is used; if the information is a title or the like, it is converted into a numeral value using a quantification technique such as principal component analysis, and a distance measure such as Euclidean Distance is defined before performing clustering. Typical clustering techniques may include a K-means method and a hierarchical clustering method.

It is preferable to perform clustering in which preference distances are reflected (for example, constrained clustering). In order to do that, collections of partially correct answers (such as a set of actual information items close to the preferences and a set of actual information items far from the preferences) are created by a preliminary study, and a numerical representation, distance, and clustering method meeting them are used. It is further preferable to select a clustering technique that provides high independency to the cluster layers to be formed (that is, clustering technique having different characteristics).

For example, a method for selecting two clustering techniques having different characteristics from among four clustering techniques (hereinafter referred to as "first to fourth techniques") will be described with reference to FIGS. 6 to 10.

First, Artists A to J, which constitute actual information of metadata, are subjected to clustering using the first to fourth techniques. It is assumed that results shown in FIG. 6 have been obtained.

That is, using the first technique, Artists A to C are subjected to clustering into a cluster CL1, Artists D to G are subjected to clustering into a cluster CL2, and Artists H to J are subjected to clustering into a cluster CL3. Using the second technique, Artists A and B are subjected to clustering into the cluster CL1, Artists C to F are subjected to clustering into the cluster CL2, and Artists G to J are subjected to clustering into the cluster CL3. Using the third technique, Artists A, D, G, and J are subjected to clustering into the cluster CL1, Artists B, E, and H are subjected to clustering into the cluster CL2, and Artists C, F, and I are subjected to clustering into the cluster CL3. Using the fourth technique, Artists D, I, and J are subjected to clustering into the cluster CL1, Artists E to G are subjected to clustering into the cluster CL2, and Artists A to C and H are subjected to clustering into the cluster CL3.

In this case, overlap rates (expressed in %) of the results using the first to fourth techniques are shown in FIG. 7. That is, the overlap rate between the first and second techniques is 0.8, the overlap rate between the first and third techniques is 0.3, the overlap rate between the first and fourth techniques is 0.4, the overlap rate between the second and third techniques is 0.3, the overlap rate between the second and fourth techniques is 0.3, and the overlap rate between the third and fourth techniques is 0.4.

It is considered that the lower the overlap rate shown in FIG. 7, the larger the difference in characteristics between two techniques. It is therefore preferable to use a combination having a minimum overlap rate of 0.3, namely, a combination of the first and third techniques, a combination of the second and third techniques, or a combination of the second and fourth techniques.

On the other hand, in a case where the user himself/herself determines whether or not two of Artists A to J are to be classified into the same cluster, it is assumed that results shown in FIG. 8 have been obtained. It is to be noted that in FIG. 8, "1" means that they are to be classified into the same cluster and "0" means that they are to be classified into different clusters. That is, as is illustrated in FIG. 8, for example, Artist A is to be classified into the same cluster as Artists B, C, F, H, and I, and Artist B is to be classified into the same cluster as Artists C, D, E, and J.

Given the results shown in FIG. 8 and ideal clustering results as correct answers, the correct answer rates for the above-described first to fourth techniques are shown in FIG. 9. That is, the correct answer rate for the first technique is 62.2%, the correct answer rate for the second technique is 55.6%, the correct answer rate for the third technique is 40.0%, and the correct answer rate for the fourth technique is 66.7%.

Focusing on the correct answer rates, therefore, it is preferable to use a combination with high correct answer rates, namely, a combination of the first and fourth techniques.

Further, in order to determine a combination of clustering techniques in consideration of the overlap rates and the correct answer rates, overlap rates of the correct answers using the first to fourth techniques are determined, which are shown in FIG. 10. A technique having a significantly low correct answer rate is designated from the results shown in FIG. 9, and a combination with the lowest overlap rate of the correct answer rate among the combinations excluding the designated technique may be used. That is, the third technique is designated as a technique with a significantly low correct answer rate, and the combination with the lowest overlap rate of the correct answers among the combinations excluding the third technique, that is, a combination of the second and fourth techniques is selected.

An absolute threshold value for the above-described overlap rates or correct answer rates may be designated, and a technique that does not satisfy the threshold value may be excluded. Alternatively, in order to use well-balanced techniques, for example, a general index, as in two examples given below, may be created based on the two indices (the overlap rate and the correct answer rate), and a combination of clustering techniques may be selected on the basis of the general index.

General Index=Correct Answer Rate×(1−Overlap Rate)

General Index=α·Correct Answer Rate×β(1−Overlap Rate)

(where α and β are predetermined coefficients.)

Next, three similar-music search processes for providing a music piece similar to the reference music piece and two music recommendation processes for providing a music piece matching the preferences of the user will be described.

It is assumed that as preprocessing prior to the following similar-music search processes and music recommendation processes, the clustering unit 12, the keyword setting unit 13, and the cluster information database 14 have been activated, and the cluster information database 14 has already stored therein the cluster information for the respective music pieces generated by the clustering unit 12, the cluster/music ID information generated by the cluster information database 14, and the keywords set by the keyword setting unit 13 for the respective cluster layers or the respective clusters.

First, a similar-music search process will be described.

Figure 11:
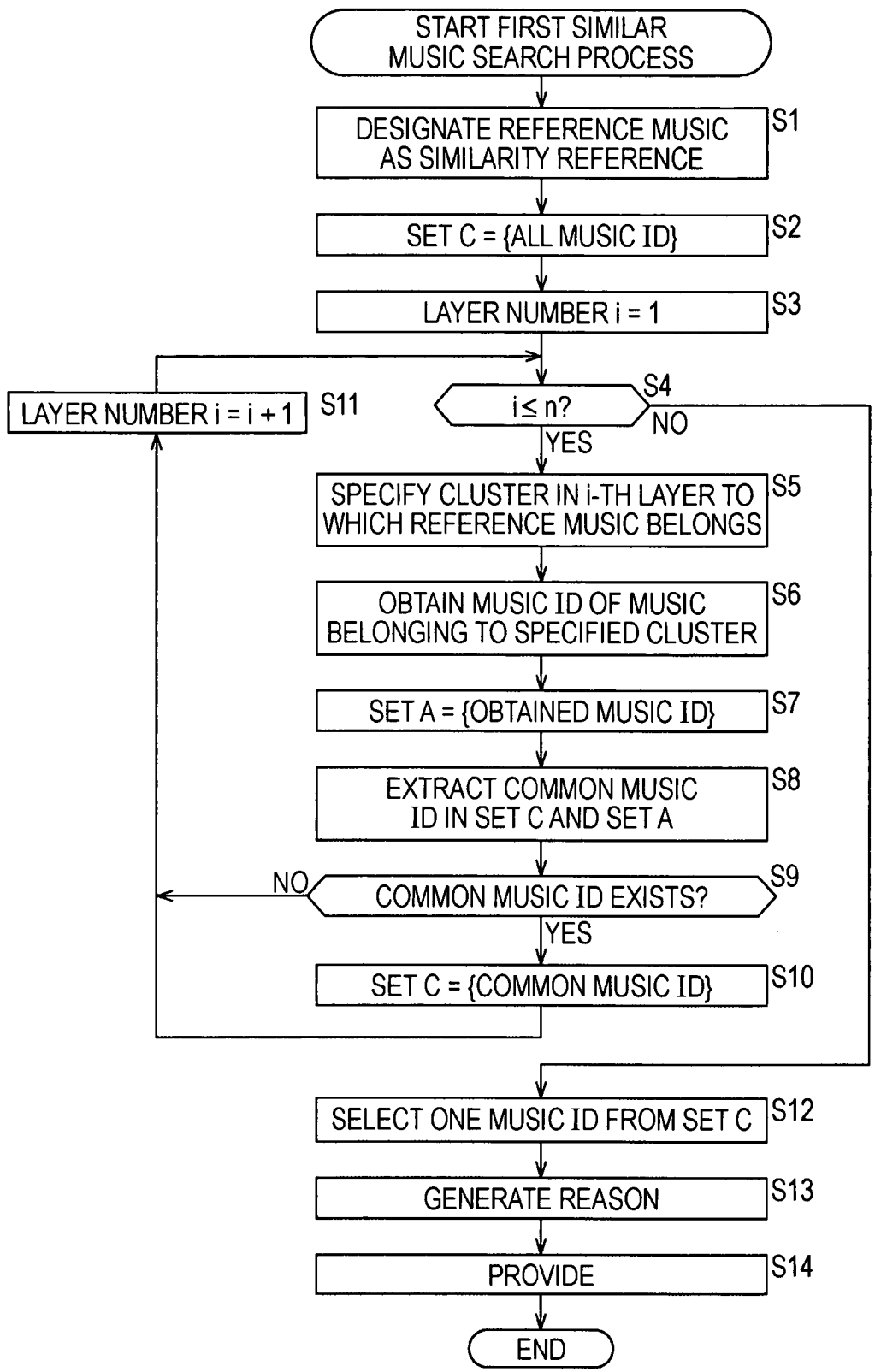
FIG. 11 is a flowchart showing a first similar-music search process.

FIG. 11 is a flowchart showing a first similar-music search process. It is assumed that as preprocessing of the first similar-music search process, the cluster information database 14 has reassigned layer numbers 1, 2, ..., n to the cluster layers in an order from the cluster layer having the highest priority according to the priority of the user with respect to the cluster layers, which is input from the preference input unit 25.

In step S1, the search music specifying unit 21 outputs a music ID and metadata of a reference music piece specified by the user to the cluster mapping unit 22. The cluster mapping unit 22 maps the input metadata of the reference music piece to an optimum cluster using an existing cluster identification technique, and supplies the result (hereinafter referred to as "optimum cluster information") to the music extraction unit 23.

In step S2, the music extraction unit 23 refers to the cluster information database 14, and assumes a set C whose elements are music IDs of all music pieces for which the cluster information is held in the cluster information database 14. In step S3, the music extraction unit 23 initializes the layer number i to 1.

In step S4, the music extraction unit 23 determines whether or not the layer number i is equal to or smaller than n (where n is the total number of cluster layers). If it is determined that the layer number i is equal to or smaller than n, the process proceeds to step S5. In step S5, the music extraction unit 23 specifies which cluster in the i-th layer the reference music piece belongs to on the basis of the optimum cluster information of the reference music piece input from the cluster mapping unit 22. The specified cluster is represented by CLix.

In step S6, the music extraction unit 23 refers to the cluster/music ID information of the cluster information database 14, and obtains music IDs of music pieces belonging to the specified cluster CLix. In step S7, the music extraction unit 23 assumes a set A whose elements are the music IDs obtained in the processing of step S6. In step S8, the music extraction unit 23 extracts elements (music IDs) common to the sets C and A, and, in step S9, determines whether or not there are common music IDs (that is, whether or not music IDs common to the sets C and A have been extracted in the processing of step S8). If it is determined that there are music IDs common to the sets C and A, the process proceeds to step S10, and the number of elements in the set C is reduced to the number of common music IDs extracted in step S8. In step S11, the music extraction unit 23 increments the layer number i by one. Then, the process returns to step S4, and the subsequent processing is repeated.

If it is determined in step S9 that there are no music IDs common to the sets C and A, step S10 is skipped and the process proceeds to step S11.

The processing of steps S4 to S11 is repeated to thereby reduce the number of elements (music IDs) in the set C. When the layer number i is greater than n and it is determined in step S4 that the layer number i is not equal to or smaller than n, the process proceeds to step S12.

In step S12, the music extraction unit 23 outputs the elements (music IDs) in the set C to the random selection unit 26. The random selection unit 26 randomly selects one music piece from the set C, and outputs the music piece to the selection reason generation unit 28. The elements (music IDs) in the set C may be output to the similarity level determination unit 27, instead of the random selection unit 26, and one music piece may be selected by the similarity level determination unit 27.

In step S13, the selection reason generation unit 28 generates a selection reason statement indicating the reason for selection of the music piece selected by the random selection unit 26 (or the similarity level determination unit 27), and outputs the selection reason statement together with the music ID of the selected music piece to the music providing unit 29. In step S14, the music providing unit 29 provides the user with the music piece of the music ID and the selection reason statement that are input from the selection reason generation unit 28.

According to the first similar-music search process described above, the calculation of the distance between the feature vector of a reference music piece and the feature vectors of other music pieces is not essential, and a music piece similar to the reference music piece can be provided while taking the priority of the user with respect to the cluster layers into consideration.

Figure 12:
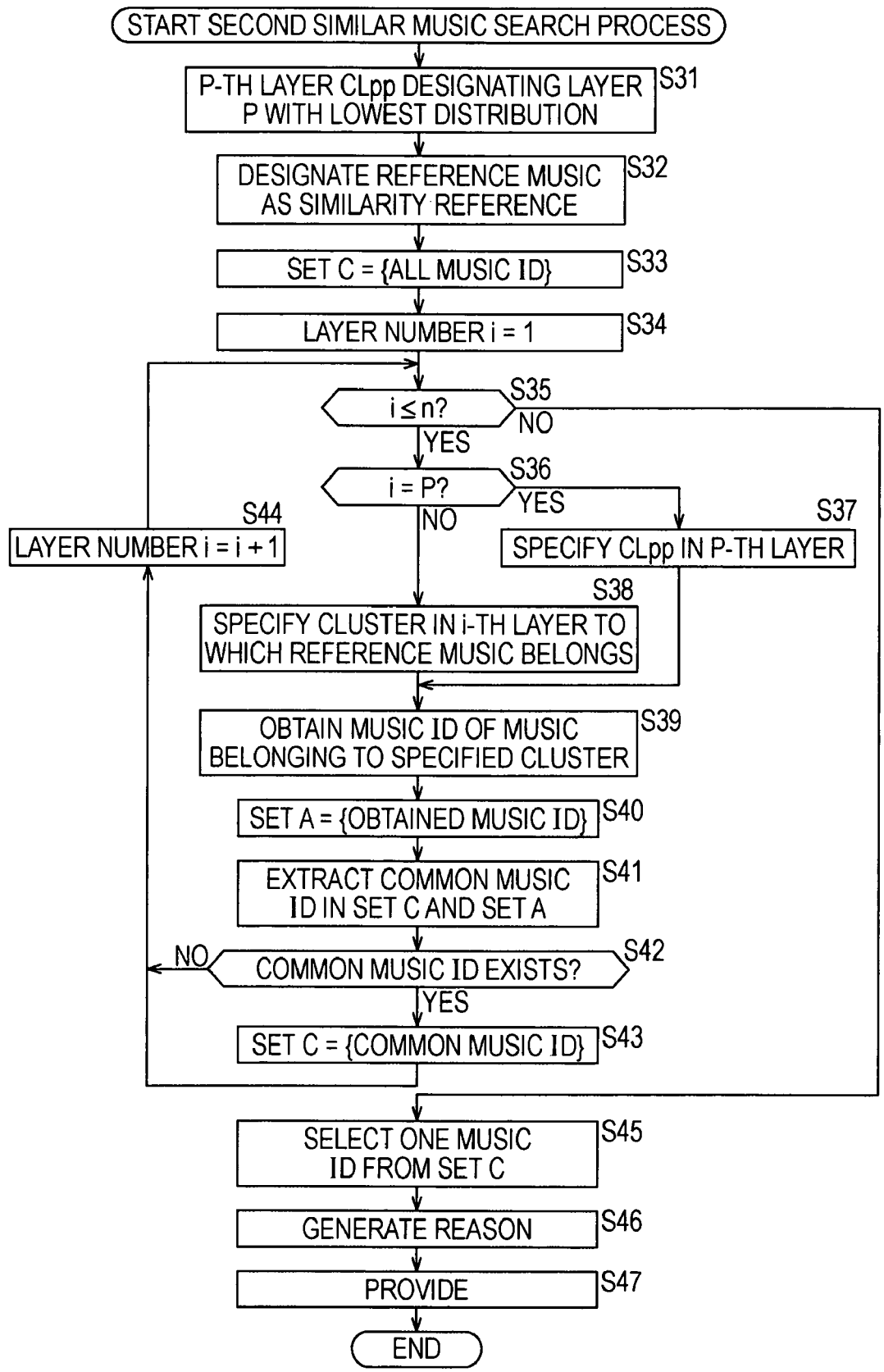
FIG. 12 is a flowchart showing a second similar-music search process.

FIG. 12 is a flowchart showing a second similar-music search process. It is assumed that as preprocessing of the second similar-music search process, the preference information database 24 has calculated a distribution of preference values in each of the cluster layers, detected a cluster layer with the lowest distribution of preference values (that is, a cluster layer in which the preferences of the user are concentrated in a particular cluster), and specified a cluster in which the preferences are concentrated. The layer number of the detected cluster layer is represented by P, and the specified cluster is represented by CLpp.

In step S31, the preference information database 24 calculates a distribution of preference values in each of the cluster layers, and detects a cluster layer with the lowest distribution of preference values (that is, a cluster layer in which the preferences of the user are concentrated in a particular cluster), which is represented as a P-th layer (where P is an integer ranging from 1 to n). The preference information database 24 further specifies a cluster in which the preferences are concentrated in the P-th layer, which is represented by CLpp.

In step S32, the search music specifying unit 21 outputs a music ID and metadata of a reference music piece specified by the user to the cluster mapping unit 22. The cluster mapping unit 22 maps the input metadata of the reference music piece to an optimum cluster using an existing cluster identification technique, and generates and supplies the optimum cluster information to the music extraction unit 23.

In step S33, the music extraction unit 23 refers to the cluster information database 14, and assumes a set C whose elements are music IDs of all music pieces for which the cluster information is held in the cluster information database 14. In step S34, the music extraction unit 23 initializes the layer number i to 1.

In step S35, the music extraction unit 23 determines whether or not the layer number i is equal to or smaller than n (where n is the total number of cluster layers). If it is determined that the layer number i is equal to or smaller than n, the process proceeds to step S36. In step S36, the music extraction unit 23 determines whether or not the layer P designated in step S31 and the layer number i coincide with each other. If it is determined that they coincide with each other, the process proceeds to step S37, and the music extraction unit 23 specifies the cluster CLpp as the object to be processed in step 39.

On the other hand, if it is determined in step S36 that the layer P designated in step S31 and the layer number i do not coincide with each other, the process proceeds to step S38. In step S38, the music extraction unit 23 specifies which cluster in the i-th layer the reference music piece belongs to on the basis of the optimum cluster information of the reference music piece input from the cluster mapping unit 22. The specified cluster is represented by CLix.

In step S39, the music extraction unit 23 refers to the cluster/music ID information of the cluster information database 14, and obtains music IDs of music pieces belonging to the cluster CLpp specified in the processing of step S37 or the cluster CLix specified in the processing of step S38.

In step S40, the music extraction unit 23 assumes a set A whose elements are the music IDs obtained in the processing of step S39. In step S41, the music extraction unit 23 extracts elements (music IDs) common to the sets C and A, and, in step S42, determines whether or not there are common music IDs (that is, whether or not music IDs common to the sets C and A have been extracted in the processing of step S41). If it is determined that there are music IDs common to the sets C and A, the process proceeds to step S43, and the number of elements in the set C is reduced to the number of common music IDs extracted in step S41. In step S44, the music extraction unit 23 increments the layer number i by one. Then, the process returns to step S35, and the subsequent processing is repeated.

If it is determined in step S42 that there are no music IDs common to the sets C and A, step S43 is skipped and the process proceeds to step S44.

The processing of steps S35 to S44 is repeated to thereby reduce the number of elements (music IDs) in the set C. When the layer number i is greater than n and it is determined in step S35 that the layer number i is not equal to or smaller than n, the process proceeds to step S45.

In step S45, the music extraction unit 23 outputs the elements (music IDs) in the set C to the random selection unit 26. The random selection unit 26 randomly selects one music piece from the set C, and outputs the music piece to the selection reason generation unit 28. The elements (music IDs) in the set C may be output to the similarity level determination unit 27, instead of the random selection unit 26, and one music piece may be selected by the similarity level determination unit 27.

In step S46, the selection reason generation unit 28 generates a selection reason statement indicating the reason for selection of the music piece selected by the random selection unit 26 (or the similarity level determination unit 27), and outputs the selection reason statement together with the music ID of the selected music piece to the music providing unit 29. In step S47, the music providing unit 29 provides the user with the music piece of the music ID and the selection reason statement that are input from the selection reason generation unit 28.

According to the second similar-music search process described above, the calculation of the distance between the feature vector of a reference music piece and the feature vectors of other music pieces is not essential, and a music piece that belongs to a cluster whose preference value representing the preferences of the user is high and that is similar to the reference music piece can be provided.

Figure 13:
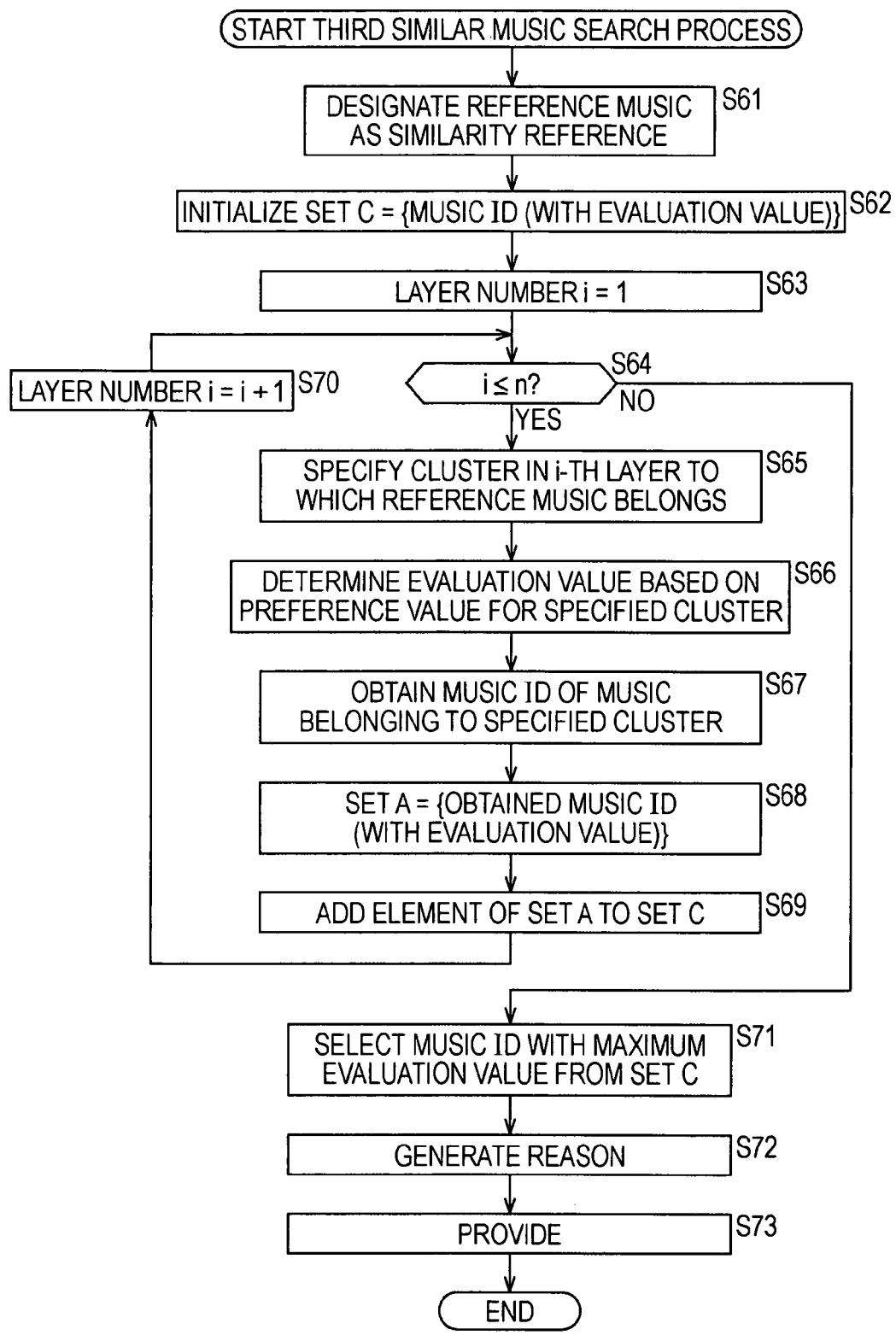
FIG. 13 is a flowchart showing a third similar-music search process.

FIG. 13 is a flowchart showing a third similar-music search process.

In step S61, the search music specifying unit 21 outputs a music ID and metadata of a reference music piece specified by the user to the cluster mapping unit 22. The cluster mapping unit 22 maps the input metadata of the reference music piece to an optimum cluster using an existing cluster identification technique, and supplies the optimum cluster information to the music extraction unit 23.

In step S62, the music extraction unit 23 assumes and initializes a set C whose elements are music IDs with evaluation values. That is, at this time point, the set C is an empty set. In step S63, the music extraction unit 23 initializes the layer number i to 1.

In step S64, the music extraction unit 23 determines whether or not the layer number i is equal to or smaller than n (where n is the total number of cluster layers). If it is determined that the layer number i is equal to or smaller than n, the process proceeds to step S65. In step S65, the music extraction unit 23 specifies which cluster in the i-th layer the reference music piece belongs to on the basis of the optimum cluster information of the reference music piece input from the cluster mapping unit 22. The specified cluster is represented by CLix.

In step S66, the music extraction unit 23 refers to the preference information database 24 to obtain the preference value for the user with respect to the cluster CLix specified in the processing of step S65, and determines evaluation values assigned to music pieces belonging to the cluster CLix on the basis of the obtained preference value.

In step S67, the music extraction unit 23 refers to the cluster/music ID information of the cluster information database 14, and obtains music IDs of the music pieces belonging to the specified cluster CLix. In step S68, the music extraction unit 23 assigns the evaluation values determined in the processing of step S66 to the music IDs obtained in the processing of step S67. Thus, the music extraction unit 23 assumes a set A whose elements are the music IDs with the evaluation values.

In step S69, the music extraction unit 23 adds the elements (the music IDs with the evaluation values) in the set A to the set C. In step S70, the music extraction unit 23 increments the layer number i by one. Then, the process returns to step S64, and the subsequent processing is repeated.

The processing of steps S64 to S70 is repeated to thereby increase the number of elements (music IDs with evaluation values) in the set C. When the layer number i is greater than n and it is determined in step S64 that the layer number i is not equal to or smaller than n, the process proceeds to step S71.

In step S71, the music extraction unit 23 selects an element with the highest evaluation value from among the elements (music IDs with evaluation values) in the set C, and outputs the element to the selection reason generation unit 28 via the random selection unit 26 (or the similarity level determination unit 27).

In step S72, the selection reason generation unit 28 generates a selection reason statement indicating the reason for selection of the music piece selected by the music extraction unit 23, and outputs the selection reason statement together with the music ID of the selected music piece to the music providing unit 29. In step S73, the music providing unit 29 provides the user with the music piece of the music ID and the selection reason statement that are input from the selection reason generation unit 28.

According to the third similar-music search process described above, the calculation of the distance between the feature vector of a reference music piece and the feature vectors of other music piece is not essential, and a music piece whose evaluation value assigned according to the preferences of the user is the highest among the music pieces similar to the reference music piece can be provided.

In the above-described first to third similar-music search processes, a music piece is specified as a search condition. A similar-music search process may be performed by designating an artist, an album, or the like. In such a case, the music IDs shown in FIGS. 3 and 4 may read artist. IDs or album IDs. For example, in a case where an artist is designated as a search condition, cluster layers corresponding to the title, album, genre, and the like related to the artist in FIG. 2 are used.

Next, a music recommendation process will be described.

Figure 14:
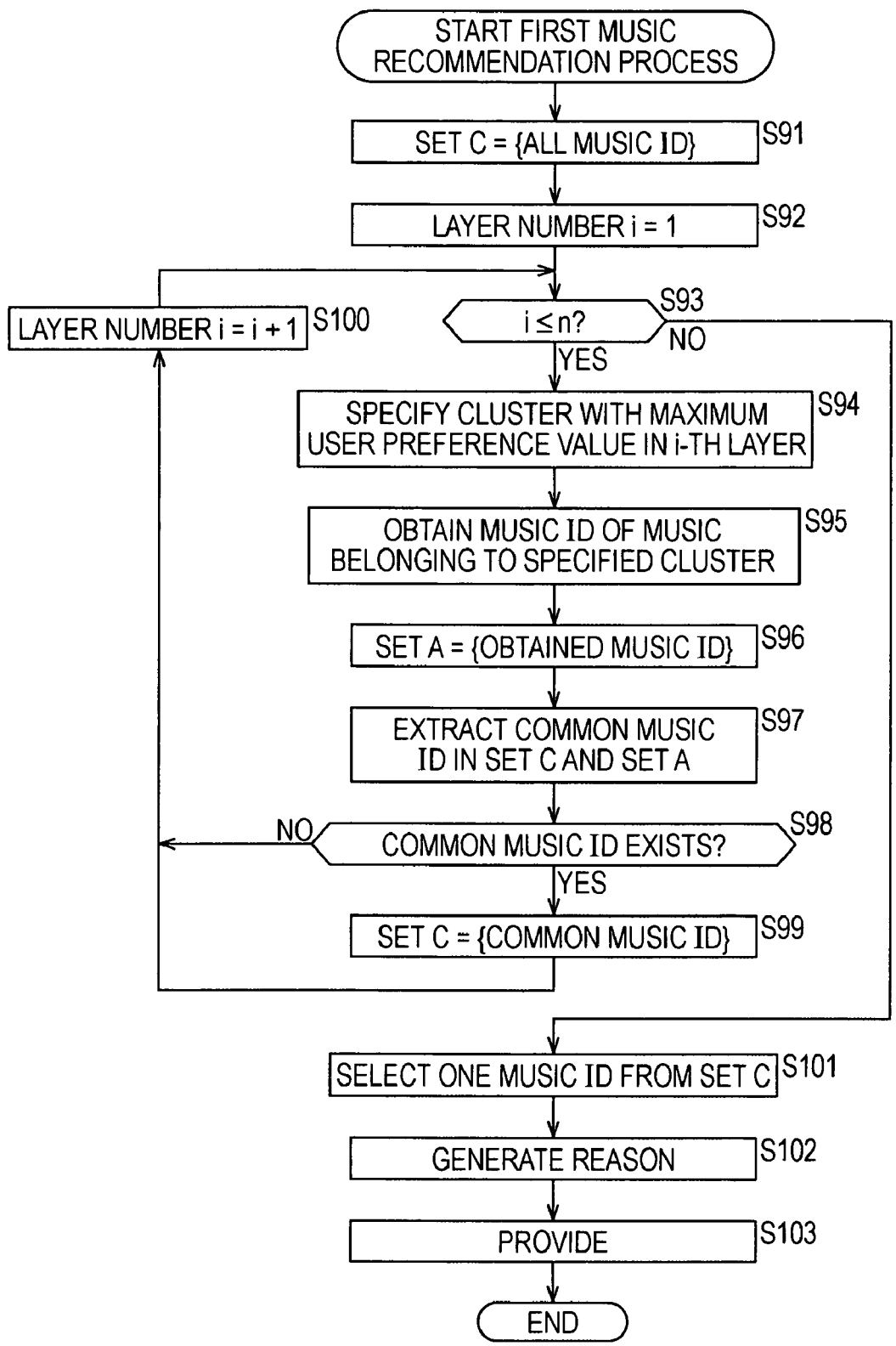
FIG. 14 is a flowchart showing a first music recommendation process.

FIG. 14 is a flowchart showing a first music recommendation process. It is assumed that as preprocessing of the first music recommendation process, the cluster information database 14 has reassigned layer numbers 1, 2, . . . , n to the cluster layers in an order from the cluster layer having the highest priority according to the priority of the user with respect to the cluster layers, which is input from the preference input unit 25.

In step S91, the music extraction unit 23 refers to the cluster information database 14, and assumes a set C whose elements are music IDs of all music pieces for which the cluster information is held in the cluster information database 14. In step S92, the music extraction unit 23 initializes the layer number i to 1.

In step S93, the music extraction unit 23 determines whether or not the layer number i is equal to or smaller than n (where n is the total number of cluster layers). If it is determined that the layer number i is equal to or smaller than n, the process proceeds to step S94. In step S94, the music extraction unit 23 refers to the preference information database 24, and specifies a cluster having the maximum preference value for the user among the clusters in the i-th layer. The specified cluster is represented by CLix.

In step S95, the music extraction unit 23 refers to the cluster/music ID information of the cluster information database 14, and obtains music IDs of music pieces belonging to the specified cluster CLix. In step S96, the music extraction unit 23 assumes a set A whose elements are the music IDs obtained in the processing of step S95. In step S97, the music extraction unit 23 extracts elements (music IsD) common to the sets C and A, and, in step S98, determines whether or not there are common music IDs (that is, whether or not music IDs common to the sets C and A have been extracted in the processing of step S97). If it is determined that there are music IDs common to the sets C and A, the process proceeds to step S99, and the number of elements in the set C is reduced to the number of common music IDs extracted in step S97. In step S100, the music extraction unit 23 increments the layer number i by one. Then, the process returns to step S93, and the subsequent processing is repeated.

If it is determined in step S98 that there are no music IDs common to the sets C and A, step S99 is skipped and the process proceeds to step S100.

The processing of steps S93 to S100 is repeated to thereby reduce the number of elements (music IDs) in the set C. When the layer number i is greater than n and it is determined in step S93 that the layer number i is not equal to or smaller than n, the process proceeds to step S101.

In step S101, the music extraction unit 23 outputs the elements (music IDs) in the set C to the random selection unit 26. The random selection unit 26 randomly selects one music piece from the set C, and outputs the music piece to the selection reason generation unit 28. The elements (music IDs) in the set C may be output to the similarity level determination unit 27, instead of the random selection unit 26, and one music piece may be selected by the similarity level determination unit 27.

In step S102, the selection reason generation unit 28 generates a selection reason statement indicating the reason for selection of the music piece selected by the random selection unit 26 (or the similarity level determination unit 27), and outputs the selection reason statement together with the music ID of the selected music piece to the music providing unit 29. In step S103, the music providing unit 29 provides the user with the music piece of the music ID and the selection reason statement that are input from the selection reason generation unit 28.

According to the first music recommendation process described above, the calculation of the distance between the feature vector corresponding to the preferences of the user and the feature vectors of music pieces is not essential, and a music piece matching the preferences of the user can be recommended to the user while taking the priority of the user with respect to the cluster layers into consideration.

Figure 15:
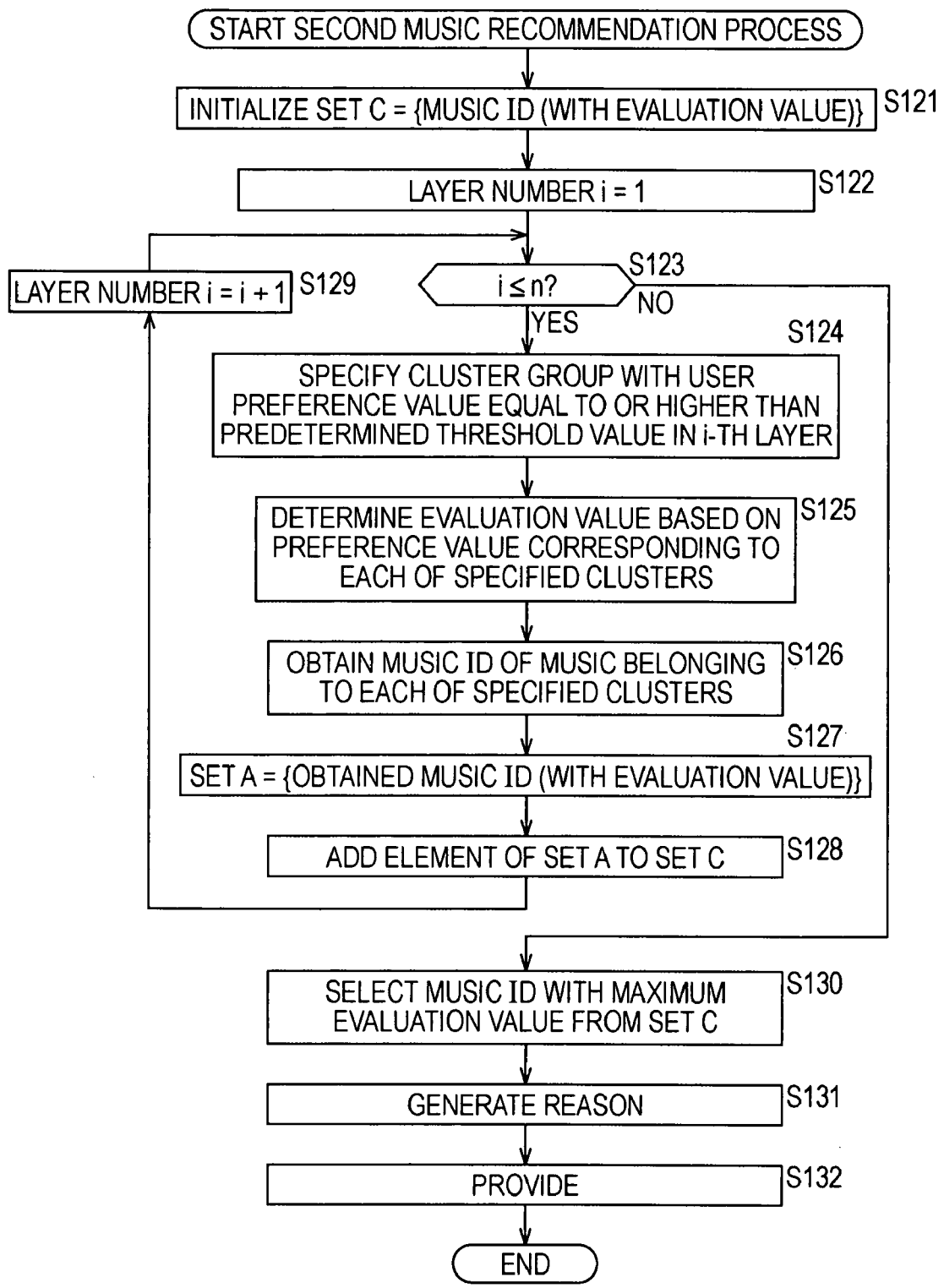
FIG. 15 is a flowchart showing a second music recommendation process.

FIG. 15 is a flowchart showing a second music recommendation process.

In step S121, the music extraction unit 23 assumes and initializes a set C whose elements are music IDs with evaluation values. That is, at this time point, the set C is an empty set. In step S122, the music extraction unit 23 initializes the layer number i to 1.

In step S123, the music extraction unit 23 determines whether or not the layer number i is equal to or smaller than n (where n is the total number of cluster layers). If it is determined that the layer number i is equal to or smaller than n, the process proceeds to step S124. In step S124, the music extraction unit 23 refers to the preference information database 24, and specifies clusters whose preference value corresponding to the preferences of the user is equal to or higher than a predetermined value among the clusters in the i-th layer. The specified clusters are represented by a cluster group CLix.

In step S125, the music extraction unit 23 determines evaluation values to be assigned to the music pieces belonging to the clusters of the cluster group CLix on the basis of the preference value for the clusters of the cluster group CLix specified in the processing of step S124.

In step S126, the music extraction unit 23 refers to the cluster/music ID information of the cluster information database 14, and obtains music IDs of the music pieces belonging to the clusters of the specified cluster group CLix. In step S127, the music extraction unit 23 assigns the evaluation values determined in the processing of step S125 to the music IDs obtained in the processing of step S126. Thus, the music extraction unit 23 assumes a set A whose elements are the music IDs with the evaluation values.

In step S128, the music extraction unit 23 adds the elements (the music IDs with the evaluation values) in the set A to the set C. If the same music ID is found in the set C, the evaluation values are summed. In step S129, the music extraction unit 23 increments the layer number i by one. Then, the process returns to step S123, and the subsequent processing is repeated.

The processing of steps S123 to S129 is repeated to thereby increase the number of elements (music IDs with evaluation values) in the set C. When the layer number i is greater than n and it is determined in step S123 that the layer number i is not equal to or smaller than n, the process proceeds to step S130.

In step S130, the music extraction unit 23 selects an element with the highest evaluation value among the elements (music IDs with evaluation values) in the set C, and outputs the element to the selection reason generation unit 28 via the random selection unit 26 (or the similarity level determination unit 27).

In step S131, the selection reason generation unit 28 generates a selection reason statement indicating the reason for selection of the music piece selected by the music extraction unit 23, and outputs the selection reason statement together with the music ID of the selected music piece to the music providing unit 29. In step S132, the music providing unit 29 provides the user with the music piece of the music ID and the selection reason statement that are input from the selection reason generation unit 28.

According to the second music recommendation process described above, the calculation of the distance between the feature vector corresponding to the preferences of the user and the feature vectors of music pieces is not essential, and a music piece whose evaluation value assigned according to the preferences of the user is the highest can be recommended to the user.

According to the above-described first to third similar-music search processes and first and second music recommendation processes, a music piece to be provided can be selected without determining the distance (such as cosine correlation) between the feature vector corresponding to the reference music piece or the preferences of the user and the feature vectors of the music pieces to be searched. Further, in either process, the higher priority can be given to the preferences of the user, and the degree of satisfaction of the user for search or recommendation can be improved.

Since candidate music pieces to be provided for each of the cluster layers are selected, there is an advantage that a so-called rounding problem caused by the summation of the preferences does not occur.

Further, each of items of metadata of music pieces, which can be represented by a numerical value, is directly used for the clustering so as to be reflected in the distance between the clusters. The information can therefore be maximally utilized.

The cluster layers may be divided into groups and may be partially used. For example, {a related-artist layer, an artist-genre layer, and an artist-review-text layer} may be defined as an artist search/recommendation group, and {a music-feature-value layer (tempo, rhythm, etc.), a song-genre layer, and a song-review-text layer} may be defined as a music search/recommendation group.

Figure 16:
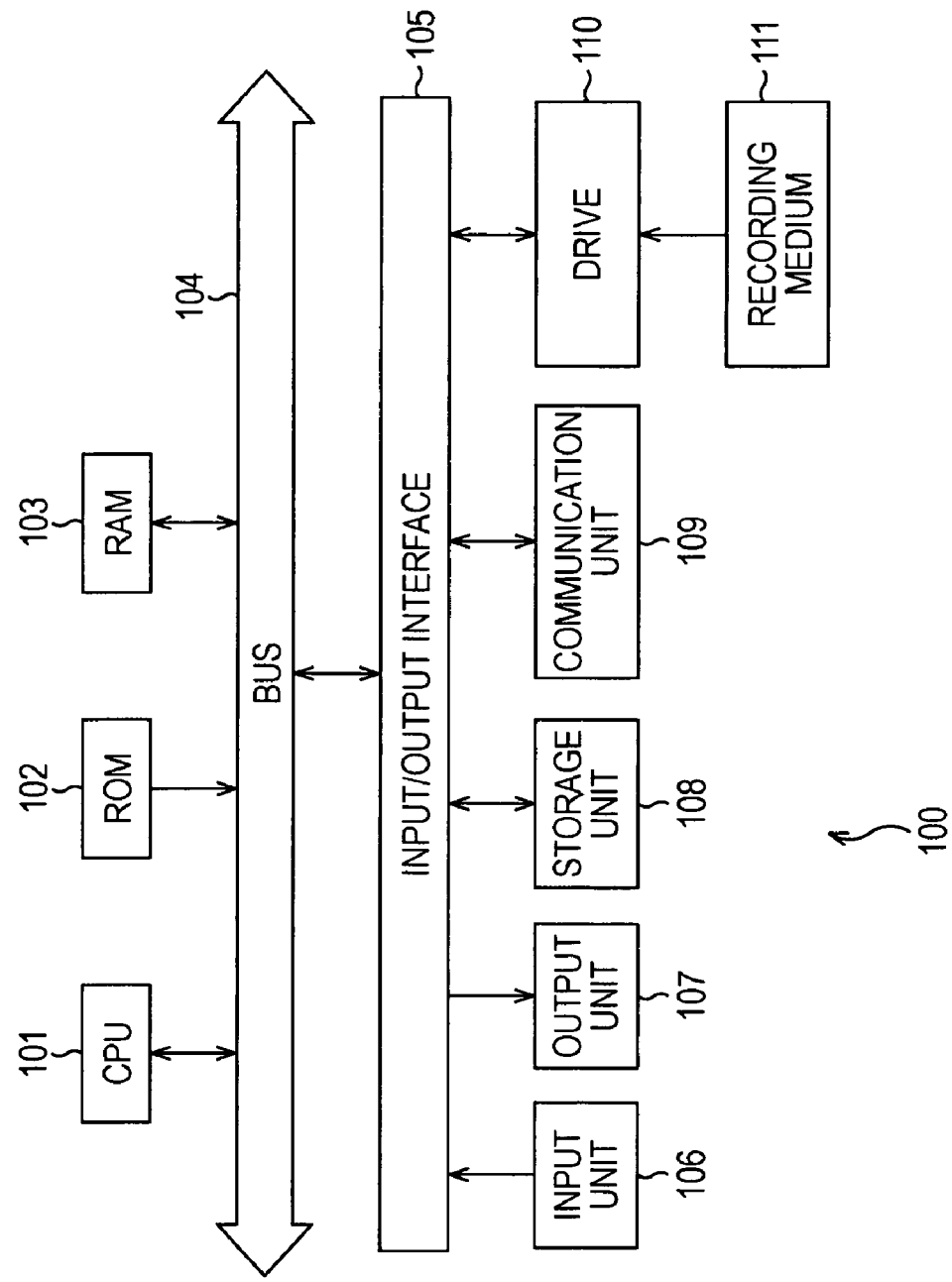
FIG. 16 is a block diagram showing an example structure of a general-purpose personal computer.

The series of processes described above may be executed by hardware or software. When the series of processes is executed by software, a program constituting the software is installed from a recording medium onto a computer included in special hardware, a general-purpose personal computer having a structure shown in, for example, FIG. 16 and capable of executing various functions with various programs installed therein, or the like.

The personal computer 100 includes a built-in CPU (Central Processing Unit) 101. An input/output interface 105 is connected to the CPU 101 via a bus 104. A ROM (Read Only Memory) 102 and a RAM (Random Access Memory) 103 are connected to the bus 104.

An input unit 106 formed of input devices such as a keyboard and a mouse for inputting an operation command by the user, an output unit 107 formed of a display such as a CRT (Cathode Ray Tube) or an LCD (Liquid Crystal Display) for displaying a screen, a storage unit 108 formed of a hard disk drive or the like for storing programs and various data, and a communication unit 109 formed of a modem, a LAN (Local Area Network) adapter, and the like and operable to perform communication via a network such as the Internet are connected to the input/output interface 105. A drive 110 for reading and writing data from and to a recording medium 111 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory is also connected.

A program for causing the personal computer 100 to execute the series of processes described above is supplied to the personal computer 100 in a state where the program is stored in the recording medium 111, and is read by the drive 110 and installed into a built-in hard disk drive of the storage unit 108. The program installed in the storage unit 108 is loaded from the storage unit 108 to the RAM 103 for execution according to an instruction of the CPU 101 corresponding to a user's command input to the input unit 106.

Figure 17:
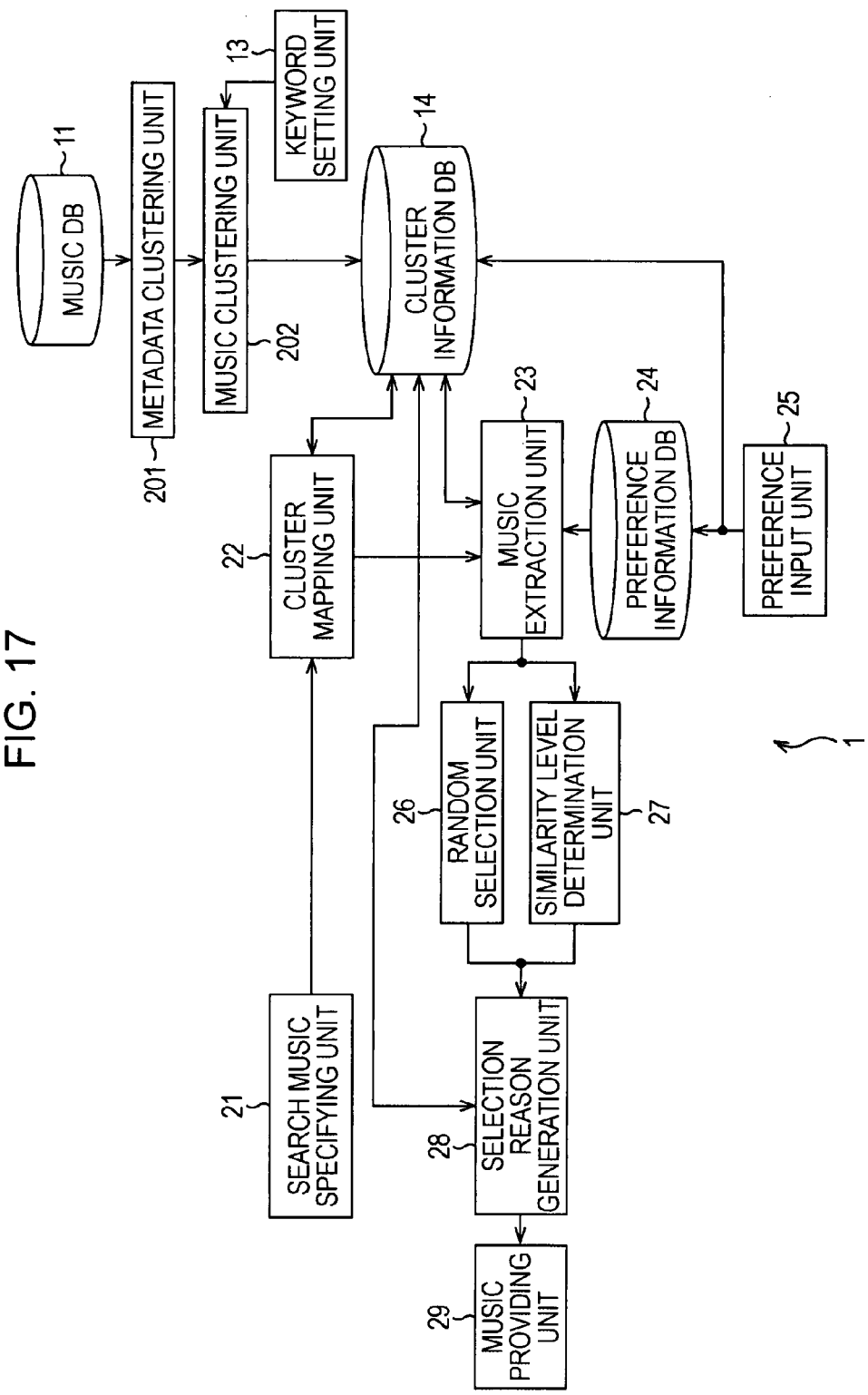
FIG. 17 is a block diagram showing another example structure of a recommendation system of an embodiment of the present invention.

FIG. 17 is a block diagram showing another example structure of the recommendation system 1 of an embodiment of the present invention. In FIG. 17, similar components to those shown in FIG. 1 are assigned the same reference numerals, and a description thereof is omitted.

The recommendation system 1 shown in FIG. 17 includes a music DB 11, a keyword setting unit 13, a cluster information DB 14, a search music specifying unit 21, a cluster mapping unit 22, a music extraction unit 23, a preference information database 24, a preference input unit 25, a random selection unit 26, a similarity level determination unit 27, a selection reason generation unit 28, a music providing unit 29, a metadata clustering unit 201, and a music clustering unit 202.

The metadata clustering unit 201 performs clustering on the metadata of each of the music pieces recorded on the music database 11. That is, the metadata clustering unit 201 classifies the metadata of each of the music pieces constituting content into any of a plurality of clusters, and allocates layers to the clusters.

The metadata clustering unit 201 supplies a result of the clustering of the metadata of each of the music pieces to the music clustering unit 202.

As in the clustering unit 12, the music clustering unit 202 also performs clustering on each of the music pieces on the basis of the result of the clustering of the metadata of each of the music pieces by the metadata clustering unit 201, and generates cluster information for each of the music pieces. That is, the music clustering unit 202 generates cluster information on the basis of the result of the clustering of each of the music pieces, and outputs the cluster information to the cluster information DB 14.

Figure 18:
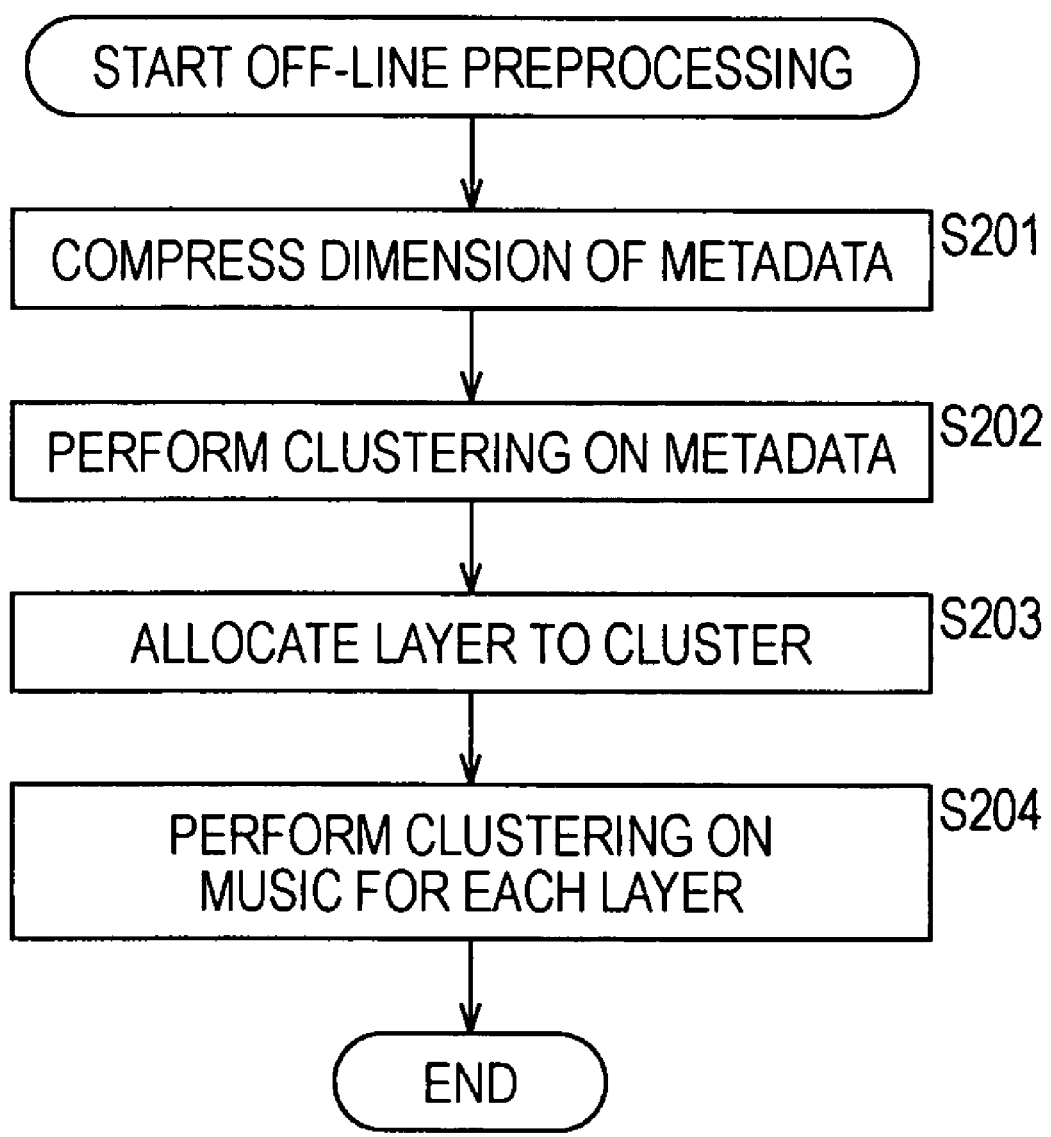
FIG. 18 is a flowchart showing an example of off-line preprocessing.

Next, an example of off-line preprocessing to be performed prior to a process for recommending a music piece in the recommendation system 1 shown in FIG. 17 will be described with reference to a flowchart of FIG. 18.

In step S201, the metadata clustering unit 201 obtains the metadata of the music pieces from the music DB 11, and compresses the dimension of the obtained metadata. In step S201, for example, the metadata clustering unit 201 compresses the dimension of the metadata of the music pieces obtained from the music DB 11 using a technique such as LSA (the latent semantic analysis), PLSA (the probabilistic latent semantic analysis), or the quantification method of the third type.

In step S201, the metadata clustering unit 201 may convert the metadata of the music pieces into vectors.

In step S202, the metadata clustering unit 201 performs clustering on the metadata of each of the music pieces. In step S202, for example, the metadata clustering unit 201 performs soft-clustering on the metadata of each of the music pieces.

More specifically, for example, as shown in FIG. 19, the metadata clustering unit 201 performs soft-clustering on the metadata of each of the music pieces so that the sum of belonging weights of an item for clusters in each of the layers can be equal to 1.

For example, the belonging weights of the metadata of the music piece identified by music ID ABC123 with respect to the first, second, third, and fourth clusters in the first layer (layer number 1) are 0.0, 0.8, 0.0, and 0.2, respectively. The belonging weights of the metadata of the music piece identified by music ID ABC123 with respect to the fifth, sixth, seventh, and eighth clusters in the second layer (layer number 2) are 0.4, 0.6, 0.0, and 0.0, respectively. The belonging weights of the metadata of the music piece identified by music ID ABC123 with respect to the ninth, tenth, and eleventh clusters in the third layer (layer number 3) are 0.0, 0.0, and 1.0, respectively. The belonging weights of the metadata of the music piece identified by music ID ABC123 with respect to four clusters in the n-th layer (layer number n) are 1.0, 0.0, 0.0, and 0.0, respectively.

For example, the belonging weights of the metadata of the music piece identified by music ID CTH863 with respect to the first, second, third, and fourth clusters in the first layer are 1.0, 0.0, 0.0, and 0.0, respectively. The belonging weights of the metadata of the music piece identified by music ID CTH863 with respect to the fifth, sixth, seventh, and eighth clusters in the second layer are 0.0, 0.5, 0.5, and 0.0, respectively. The belonging weights of the metadata of the music piece identified by music ID CTH863 with respect to the ninth, tenth, and eleventh clusters in the third layer are 0.7, 0.3, and 0.0, respectively. The belonging weights of the metadata of the music piece identified by music ID CTH863 with respect to the four clusters in the n-th layer are 0.0, 0.8, 0.2, and 0.0, respectively.

For example, the belonging weights of the metadata of the music piece identified by music ID XYZ567 with respect to the first, second, third, and fourth clusters in the first layer are 0.0, 0.4, 0.6, and 0.0, respectively. The belonging weights of the metadata of the music piece identified by music ID XYZ567 with respect to the fifth, sixth, seventh, and eighth clusters in the second layer are 0.0, 0.0, 0.0, and 1.0, respectively. The belonging weights of the metadata of the music piece identified by music ID XYZ567 with respect to the ninth, tenth, and eleventh clusters in the third layer are 0.9, 0.0, and 0.1, respectively. The belonging weights of the metadata of the music piece identified by music ID XYZ567 with respect to the four clusters in the n-th layer are 0.3, 0.0, 0.0, and 0.7, respectively.

The soft-clustering for the metadata of each of the music pieces is not limited to the case in which the sum of belonging weights of an item, that is, a music piece, with respect to clusters in each of the layers is equal to 1. Each item may not belong to any cluster in each of the layers.

In step S203, the metadata clustering unit 201 allocates layers of clusters.

The clustering of the metadata and the allocation of the layers of clusters will be described with reference to FIGS. 20 and 21. FIG. 20 is a diagram showing an example of the metadata. The metadata shown in FIG. 20 is categorical data having a value of either 0 or 1 for easy understanding.

A meta-group 1 as a high-order class contains metadata 1, metadata 2, and metadata 3. A meta-group 2 as a high-order class contains metadata 4, metadata 5, and metadata 6. For example, the meta-group 1 contains metadata related to artists, in which the metadata 1 represents the appearance of an artist and the metadata 2 represents a group. For example, the meta-group 2 contains metadata related to genres, in which the metadata 4 represents pop music and the metadata 5 represents rock music.

In the example shown in FIG. 20, the metadata 1 to the metadata 6 of the music piece identified by music ID ABC123 are 1, 1, 1, 1, 1, and 1, respectively; the metadata 1 to the metadata 6 of the music piece identified by music ID CTH863 are 0, 1, 0, 0, 1, and 1, respectively; and the metadata 1 to the metadata 6 of the music piece identified by music ID XYZ567 are 1, 1, 1, 1, 1, and 1, respectively. The metadata 1 to the metadata 6 of the music piece identified by music ID EKF534 are 1, 0, 1, 0, 0, and 1, respectively; and the metadata 1 to the metadata 6 of the music piece identified by music ID OPQ385 are 1, 0, 1, 1, 0, and 0, respectively.

The metadata 1 for the music pieces identified by music IDs ABC123 to OPQ385 is regarded as a vector. The metadata 2 through the metadata 6 for the music pieces identified by music IDs ABC123 to OPQ385 are also regarded as vectors. That is, the value of one piece of metadata for a plurality of music pieces is regarded as a vector.

The attention is directed to the distance between the vectors.

In the example shown in FIG. 20, the metadata 1, the metadata 3, and the metadata 4 regarded as vectors are grouped into a cluster within a Manhattan distance of 1, and the metadata 2, the metadata 5, and the metadata 6 are grouped into another cluster within a Manhattan distance of 1.

These clusters are designated as new layers of metadata. That is, each of the layers is allocated more resembling pieces of metadata.

FIG. 21 shows an example of the metadata thus subjected to clustering and allocated layers. In the example shown in FIG. 21, the first layer contains the metadata 1, the metadata 3, and the metadata 4, and the second layer contains the metadata 2, the metadata 5, and the metadata 6.

In this manner, each of the layers is formed of a collection of pieces of metadata having high correlation, and the clustering of the music pieces is performed therein. Thus, a fine difference between the music pieces, which is difficult to be represented by normal classification into layers representing the genre, the artist, and the like, can be reflected in the clusters.

Referring back to FIG. 18, in step S204, the music clustering unit 202 performs clustering on the music pieces for each of the layers, and then the process ends. That is, the music clustering unit 202 classifies each of content pieces into any of the plurality of clusters in each of the allocated layers.

By doing so, the music pieces can be subjected to clustering with a reduced amount of data and a reduced amount of calculation while maintaining high degree of details of the expression of the music pieces by the metadata (the degree by which the details are expressed).

Further, the metadata is layered in the manner described above, whereby the music pieces can be subjected to clustering so that a fine difference between the music pieces can be correctly expressed.

Figure 22:
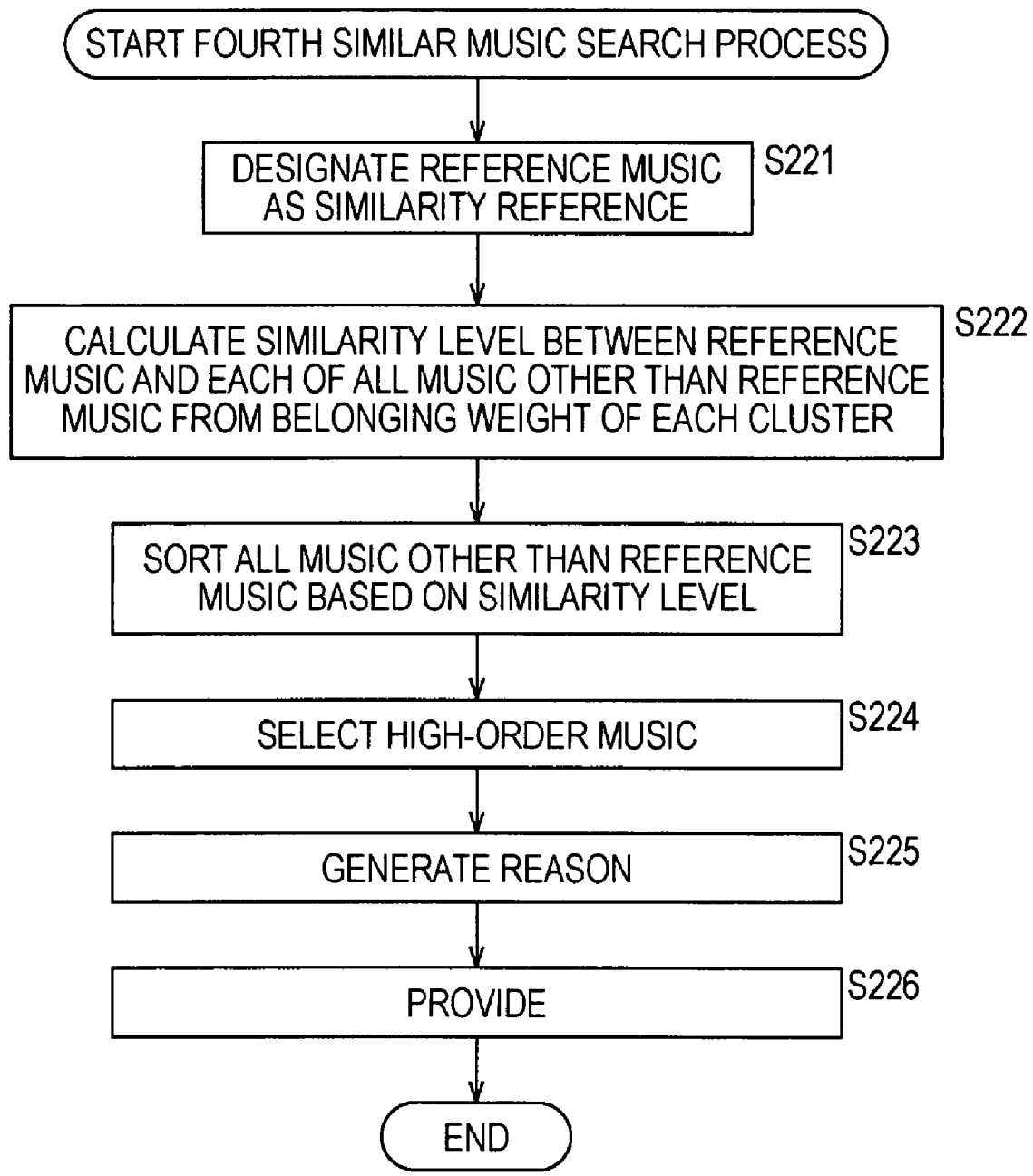
FIG. 22 is a flowchart showing a fourth similar-music search process.

Next, a fourth similar-music search process will be described with reference to a flowchart of FIG. 22. In step S221, the search music specifying unit 21 designates a reference music piece as a similarity reference. That is, in step S221, for example, the search music specifying unit 21 designates a reference music piece by outputting the music ID of the reference music piece to the music extraction unit 23 via the cluster mapping unit 22 according to the user's specification.

In step S222, the similarity level determination unit 27 calculates a similarity level between the reference music piece and each of all music pieces other than the reference music piece from the belonging weights of the clusters.

For example, the music extraction unit 23 reads the cluster information of the reference music piece identified by the music ID and the cluster information of all music pieces other than the reference music piece from the cluster information database 14. Then, the music extraction unit 23 supplies the read cluster information to the similarity level determination unit 27. The similarity level determination unit 27 calculates a similarity level between the reference music piece and each of all music pieces other than the reference music piece from the belonging weights of the clusters, which are represented by the cluster information of the reference music piece and all music pieces other than the reference music piece.

More specifically, for example, each of the music pieces is subjected to soft-clustering in each of the layers by the music clustering unit 202, and the cluster information representing the belonging weights of the clusters is stored in the cluster information database 14.

FIG. 23 is a diagram showing an example of the cluster information representing the belonging weights of the clusters.

For example, the belonging weights of the music piece identified by music ID ABC123 with respect to the clusters in the first layer, that is, the cluster identified by cluster ID CL11, the cluster identified by cluster ID CL12, the cluster identified by cluster ID CL13, and the cluster identified by cluster ID CL14, are 0.0, 1.0, 0.0, and 0.2, respectively. The belonging weights of the music piece identified by music ID ABC123 with respect to the clusters in the second layer, that is, the cluster identified by cluster ID CL21, the cluster identified by cluster ID CL22, the cluster identified by cluster ID CL23, and the cluster identified by cluster ID CL24, are 0.6, 0.8, 0.0, and 0.0, respectively.

The belonging weights of the music piece identified by music ID ABC123 with respect to the clusters in the third layer, that is, the cluster identified by cluster ID CL31, the cluster identified by cluster ID CL32, and the cluster identified by cluster ID CL33, are 0.0, 0.0, and 1.0, respectively. The belonging weights of the music piece identified by music ID ABC123 with respect to the clusters in the fourth layer, that is, the cluster identified by cluster ID CL41, the cluster identified by cluster ID CL42, the cluster identified by cluster ID CL43, and the cluster identified by cluster ID CL44, are 1.0, 0.0, 0.0, and 0.0, respectively.

For example, the belonging weights of the music piece identified by music ID CTH863 with respect to the clusters in the first layer, that is, the cluster identified by cluster ID CL11, the cluster identified by cluster ID CL12, the cluster identified by cluster ID CL13, and the cluster identified by cluster ID CL14, are 1.0, 0.0, 0.0, and 0.0, respectively. The belonging weights of the music piece identified by music ID CTH863 with respect to the clusters in the second layer, that is, the cluster identified by cluster ID CL21, the cluster identified by cluster ID CL22, the cluster identified by cluster ID CL23, and the cluster identified by cluster ID CL24, are 0.0, 0.7, 0.7, and 0.0, respectively.

The belonging weights of the music piece identified by music ID CTH863 with respect to the clusters in the third layer, that is, the cluster identified by cluster ID CL31, the cluster identified by cluster ID CL32, and the cluster identified by cluster ID CL33, are 0.9, 0.4, and 0.0, respectively. The belonging weights of the music piece identified by music ID CTH863 with respect to the clusters in the fourth layer, that is, the cluster identified by cluster ID CL41, the cluster identified by cluster ID CL42, the cluster identified by cluster ID CL43, and the cluster identified by cluster ID CL44, are 0.0, 1.0, 0.3, and 0.0, respectively.

For example, the belonging weights of the music v identified by music ID XYZ567 with respect to the clusters in the first layer, that is, the cluster identified by cluster ID CL11, the cluster identified by cluster ID CL12, the cluster identified by cluster ID CL13, and the cluster identified by cluster ID CL14, are 0.0, 0.6, 0.8, and 0.0, respectively. The belonging weights of the music piece identified by music ID XYZ567 with respect to the clusters in the second layer, that is, the cluster identified by cluster ID CL21, the cluster identified by cluster ID CL22, the cluster identified by cluster ID CL23, and the cluster identified by cluster ID CL24, are 0.0, 0.0, 0.0, and 1.0, respectively.

The belonging weights of the music piece identified by music ID XYZ567 with respect to the clusters in the third layer, that is, the cluster identified by cluster ID CL31, the cluster identified by cluster ID CL32, and the cluster identified by cluster ID CL33, are 1.0, 0.0, and 0.1, respectively. The belonging weights of the music piece identified by music ID XYZ567 with respect to the clusters in the fourth layer, that is, the cluster identified by cluster ID CL41, the cluster identified by cluster ID CL42, the cluster identified by cluster ID CL43, and the cluster identified by cluster ID CL44, are 0.5, 0.0, 0.0, and 0.9, respectively.

For example, the belonging weights of the music piece identified by music ID EKF534 with respect to the clusters in the first layer, that is, the cluster identified by cluster ID CL11, the cluster identified by cluster ID CL12, the cluster identified by cluster ID CL13, and the cluster identified by cluster ID CL14, are 0.9, 0.0, 0.0, and 0.5, respectively. The belonging weights of the music piece identified by music ID EKF534 with respect to the clusters in the second layer, that is, the cluster identified by cluster ID CL21, the cluster identified by cluster ID CL22, the cluster identified by cluster ID CL23, and the cluster identified by cluster ID CL24, are 0.0, 0.6, 0.0, and 0.8, respectively.

The belonging weights of the music piece identified by music ID EKF534 with respect to the clusters in the third layer, that is, the cluster identified by cluster ID CL31, the cluster identified by cluster ID CL32, and the cluster identified by cluster ID CL33, are 0.7, 0.0, and 0.7, respectively. The belonging weights of the music piece identified by music ID EKF534 with respect to the clusters in the fourth layer, that is, the cluster identified by cluster ID CL41, the cluster identified by cluster ID CL42, the cluster identified by cluster ID CL43, and the cluster identified by cluster ID CL44, are 0.0, 0.9, 0.4, and 0.3, respectively.

For example, the belonging weights of the music piece identified by music ID OPQ385 with respect to the clusters in the first layer, that is, the cluster identified by cluster ID CL11, the cluster identified by cluster ID CL12, the cluster identified by cluster ID CL13, and the cluster identified by cluster ID CL14, are 0.7, 0.2, 0.6, and 0.0, respectively. The belonging weights of the music piece identified by music ID OPQ385 with respect to the clusters in the second layer, that is, the cluster identified by cluster ID CL21, the cluster identified by cluster ID CL22, the cluster identified by cluster ID CL23, and the cluster identified by cluster ID CL24, are 1.0, 0.0, 0.0, and 0.0, respectively.

The belonging weights of the music piece identified by music ID OPQ385 with respect to the clusters in the third layer, that is, the cluster identified by cluster ID CL31, the cluster identified by cluster ID CL32, and the cluster identified by cluster ID CL33, are 0.0, 1.0, and 0.0, respectively. The belonging weights of the music piece identified by music ID OPQ385 with respect to the clusters in the fourth layer, that is, the cluster identified by cluster ID CL41, the cluster identified by cluster ID CL42, the cluster identified by cluster ID CL43, and the cluster indemnified by cluster ID CL44, are 0.4, 0.9, 0.0, and 0.0, respectively.

For example, the similarity level determination unit 27 determines a similarity level sim(i, j) between the reference music piece identified by music ID i and the music piece identified by music ID j by carrying out the calculation given by Eq. (1) from the belonging weights of each of the music pieces with respect to the clusters.

[Eq. 1]

$$sim(i, j) = \sum_{l \in L} \sum_{c \in C(l)} w_{ilc} w_{jlc} \quad (1)$$

In Eq. (1), L denotes the value indicating the number of layers, and l denotes the value identifying a layer. C(l) denotes the overall clusters, and c denotes the value identifying a cluster. $w_{ilc}$ denotes the belonging weight of the reference music piece identified by music ID i with respect to the c-th cluster in the l-th layer. $w_{jlc}$ denotes the belonging weight of the music piece identified by music ID j with respect to the c-th cluster in the l-th layer.

FIG. 24 is a diagram showing an example of similarity levels determined by carrying out the calculation given by Eq. (1) from the cluster information shown in FIG. 23 representing the belonging weights of the clusters. In FIG. 24, similarity levels of the music pieces identified by music IDs CTH863 to OPQ385 with respect to the reference music piece identified by music ID ABC123 are illustrated.

As shown in FIG. 24, when the similarity levels of the music pieces identified by music IDs CTH863 to OPQ385 with respect to the reference music piece identified by music ID ABC123 are determined on the basis of the cluster information shown in FIG. 23 by carrying out the calculation given by Eq. (1), the similarity levels of the music pieces identified by music IDs CTH863 to OPQ385 are 0.57, 1.18, 1.27, and 1.20, respectively.

In step S222, for example, the similarity level determination unit 27 performs the calculation given by Eq. (1) to determine the similarity levels of the music pieces identified by music IDs CTH863 to OPQ385 with respect to the reference music piece identified by music ID ABC123, which are 0.57, 1.18, 1.27, and 1.20, respectively.

In step S223, the similarity level determination unit 27 sorts all the music pieces other than the reference music piece in an order of higher similarity to the reference music piece on the basis of the similarity levels.

More specifically, the similarity level determination unit 27 associates the similarity levels of the music pieces obtained as results of the calculation with the music IDs of the music pieces, and rearranges the music IDs of the music pieces in an order of higher similarity to the reference music piece on the basis of the similarity levels so that all the music pieces other than the reference music piece can be sorted in the order of higher similarity to the reference music piece.

In step S224, the similarity level determination unit 27 selects any number of high-order music pieces from among the sorted music pieces. The similarity level determination unit 27 supplies the music ID of the selected music piece to the selection reason generation unit 28.

In step S224, for example, the similarity level determination unit 27 selects the highest-order music piece, and supplies the music ID of the highest-order music piece to the selection reason generation unit 28. Alternatively, in step S224, for example, the similarity level determination unit 27 selects ten higher-order music pieces, and supplies the music IDs of the ten higher-order music pieces to the selection reason generation unit 28.

In step S225, the selection reason generation unit 28 generates a selection reason statement indicating the reason for selection of the music piece selected by the similarity level determination unit 27, and outputs the selection reason statement together with the music ID of the selected music piece to the music providing unit 29. In step S226, the music providing unit 29 provides the user with the music piece of the music ID and the selection reason statement that are input from the selection reason generation unit 28. Then, the process ends.

Figure 25:
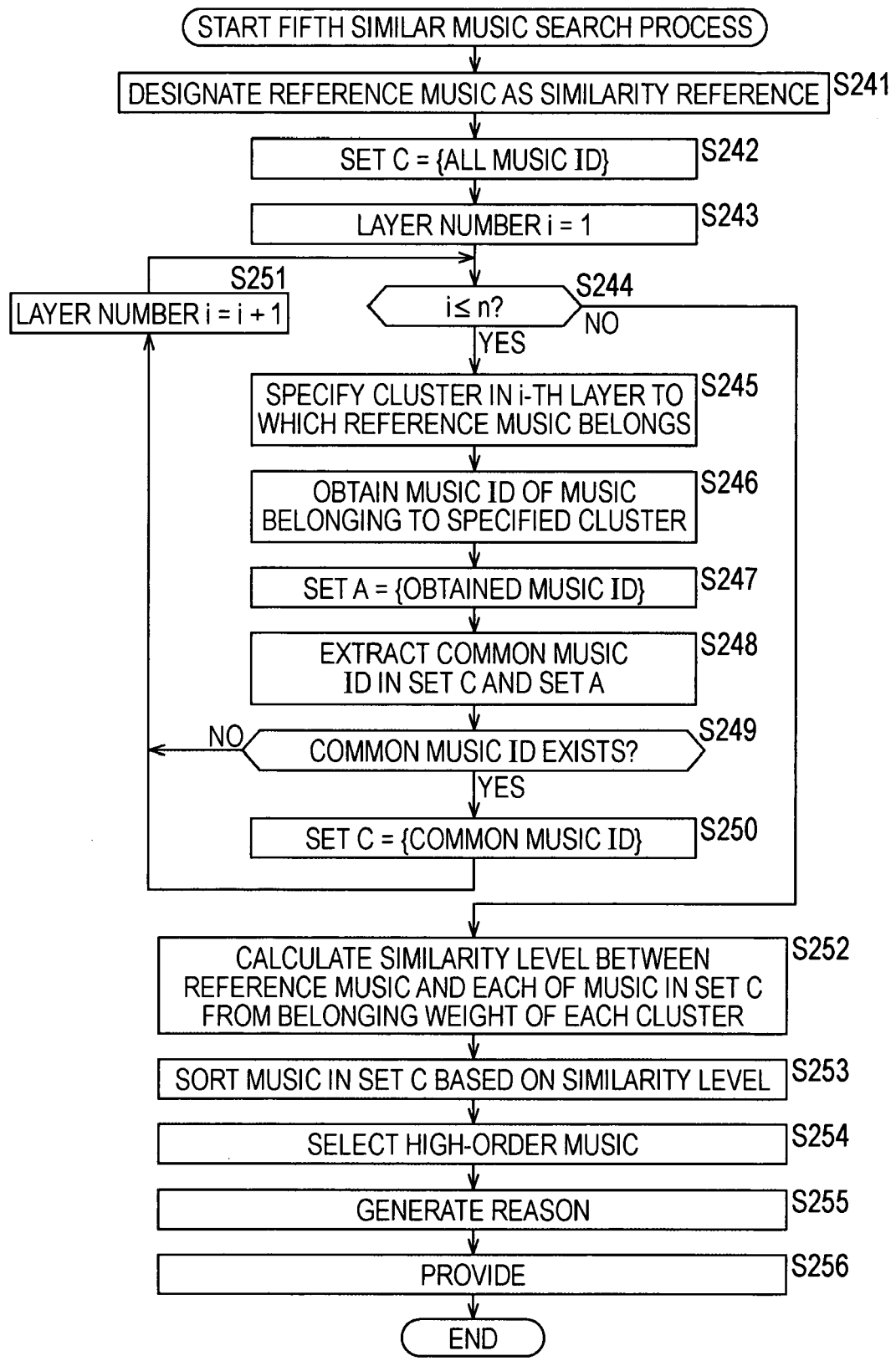
FIG. 25 is a flowchart showing a fifth similar-music search process.

Next, a fifth similar-music search process will be described with reference to a flowchart of FIG. 25. The processing of steps S241 to S251 is similar to the processing of steps S1 to S11 shown in FIG. 11, respectively, and a description thereof is thus omitted.

In step S252, the similarity level determination unit 27 calculates a similarity level between the reference music piece and each of the music pieces in the set C from the belonging weights of the clusters on the basis of the elements (music IDs) of the set C supplied from the music extraction unit 23. In step S252, for example, the similarity level determination unit 27 determines a similarity level between the reference music piece and each of the music pieces in the set C by carrying out the calculation given by Eq. (1).

In step S253, the similarity level determination unit 27 sorts the music pieces in the set C in the order of higher similarity to the reference music piece on the basis of the similarity levels.

More specifically, the similarity level determination unit 27 associates the similarity levels obtained as results of the calculation with the music IDs of the music pieces in the set C, and rearranges the music IDs of the music pieces in the set C on the basis of the similarity levels so that the music pieces in the set C can be sorted in the order of higher similarity to the reference music piece.

In step S254, the similarity level determination unit 27 selects any number of high-order music pieces from among the sorted music pieces. The similarity level determination unit 27 supplies the music ID of the selected music piece to the selection reason generation unit 28.

In step S254, for example, the similarity level determination unit 27 selects the highest-order music piece, and supplies the music ID of the highest-order music piece to the selection reason generation unit 28. Alternatively, in step S254, for example, the similarity level determination unit 27 selects ten higher-order music pieces, and supplies the music IDs of the ten higher-order music pieces to the selection reason generation unit 28.

In step S255, the selection reason generation unit 28 generates a selection reason statement indicating the reason for selection of the music piece selected by the similarity level determination unit 27, and outputs the selection reason statement together with the music ID of the selected music piece to the music providing unit 29. In step S256, the music providing unit 29 provides the user with the music piece of the music ID and the selection reason statement that are input from the selection reason generation unit 28. Then, the process ends.

Figure 26:
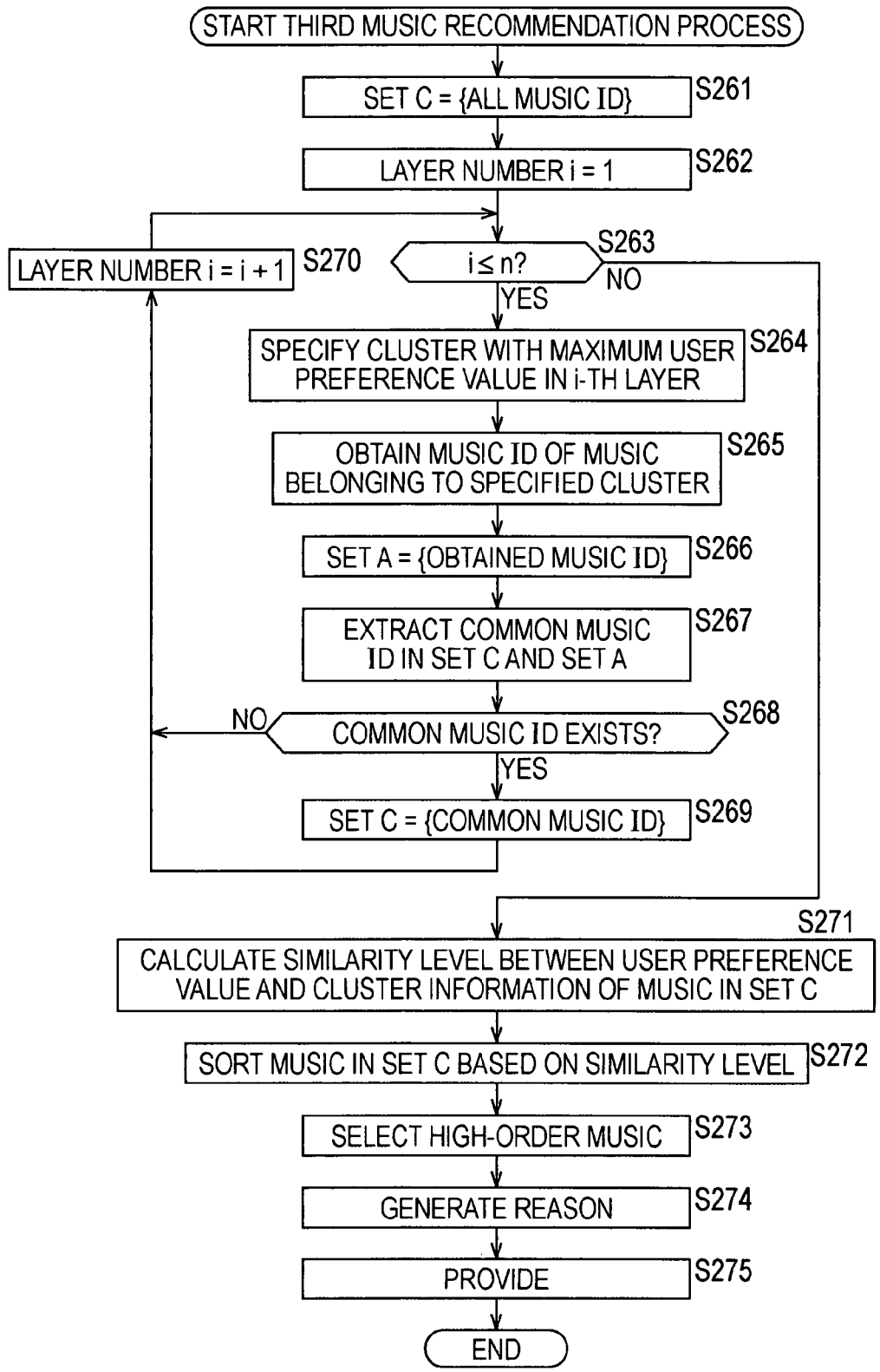
FIG. 26 is a flowchart showing a third music recommendation process.

Next, a third music recommendation process will be described with reference to a flowchart of FIG. 26. The processing of steps S261 to S270 is similar to the processing of steps S91 to S100 shown in FIG. 14, respectively, and a description thereof is thus omitted.

In step S271, the similarity level determination unit 27 calculates a similarity level between a preference value of the user representing the belonging weight of each of the clusters and cluster information for each of the music pieces in the set C, that is, cluster information indicating the belonging weight of each of the clusters on the basis of the elements (music IDs) of the set C supplied from the music extraction unit 23.

The similarity level between the preference value of the user and the cluster information for each of the music pieces in the set C will be described with reference to FIGS. 27 to 31.

For example, the preference information database 24 has recorded thereon a preference value subjected to soft-clustering and representing the belonging weight for each of the clusters in each of the layers.

FIG. 27 is a diagram showing an example of preference values representing belonging weights of the clusters.

For example, the belonging weights of the preference values of the user identified by user ID U001 with respect to the clusters in the first layer, that is, the cluster identified by cluster ID CL11, the cluster identified by cluster ID CL12, the cluster identified by cluster ID CL13, and the cluster identified by cluster ID CL14, are 0.0, 0.8, 0.0, and 0.6, respectively. The belonging weights of the preference values of the user identified by user ID U001 with respect to the clusters in the second layer, that is, the cluster identified by cluster ID CL21, the cluster identified by cluster ID CL22, the cluster identified by cluster ID CL23, and the cluster identified by cluster ID CL24, are 0.4, 0.6, 0.7, and 0.0, respectively.

The belonging weights of the preference values of the user identified by user ID U001 with respect to the clusters in the third layer, that is, the cluster identified by cluster ID CL31, the cluster identified by cluster ID CL32, and the cluster identified by cluster ID CL33, are 0.7, 0.5, and 0.5, respectively. The belonging weights of the preference values of the user identified by user ID U001 with respect to the clusters in the fourth layer, that is, the cluster identified by cluster ID CL41, the cluster identified by cluster ID CL42, the cluster identified by cluster ID CL43, and the cluster identified by cluster ID CL44, are 0.0, 0.5, 0.4, and 0.0, respectively.

FIG. 28 is a diagram showing an example of cluster information indicating belonging weights of the clusters.

For example, the belonging weights of the music piece identified by music ID ABC123 with respect to the clusters in the first layer, that is, the cluster identified by cluster ID CL11, the cluster identified by cluster ID CL12, the cluster identified by cluster ID CL13, and the cluster identified by cluster ID CL14, are 0.0, 1.0, 0.0, and 0.2, respectively. The belonging weights of the music piece identified by music ID ABC123 with respect to the clusters in the second layer, that is, the cluster identified by cluster ID CL21, the cluster identified by cluster ID CL22, the cluster identified by cluster ID CL23, and the cluster identified by cluster ID CL24, are 0.6, 0.8, 0.0, and 0.0, respectively.

The belonging weights of the music piece identified by music ID ABC123 with respect to the clusters in the third layer, that is, the cluster identified by cluster ID CL31, the cluster identified by cluster ID CL32, and the cluster identified by cluster ID CL33, are 0.0, 0.0, and 1.0, respectively. The belonging weights of the music piece identified by music ID ABC123 with respect to the clusters in the fourth layer, that is, the cluster identified by cluster ID CL41, the cluster identified by cluster ID CL42, the cluster identified by cluster ID CL43, and the cluster identified by cluster ID CL44, are 1.0, 0.0, 0.0, and 0.0, respectively.

For example, the belonging weights of the music piece identified by music ID CTH863 for the clusters in the first layer, that is, the cluster identified by cluster ID CL11, the cluster identified by cluster ID CL12, the cluster identified by cluster ID CL13, and the cluster identified by cluster ID CL14, are 1.0, 0.0, 0.0, and 0.0, respectively. The belonging weights of the music piece identified by music ID CTH863 for the clusters in the second layer, that is, the cluster identified by cluster ID CL21, the cluster identified by cluster ID CL22, the cluster identified by cluster ID CL23, and the cluster identified by cluster ID CL24, are 0.0, 0.7, 0.7, and 0.0, respectively.

The belonging weights of the music piece identified by music ID CTH863 with respect to the clusters in the third layer, that is, the cluster identified by cluster ID CL31, the cluster identified by cluster ID CL32, and the cluster identified by cluster ID CL33, are 0.9, 0.4, and 0.0, respectively. The belonging weights of the music piece identified by music ID CTH863 with respect to the clusters in the fourth layer, that is, the cluster identified by cluster ID CL41, the cluster identified by cluster ID CL42, the cluster identified by cluster ID CL43, and the cluster identified by cluster ID CL44, are 0.0, 1.1, 0.3, and 0.0, respectively.

For example, the belonging weights of the music piece identified by music ID XYZ567 with respect to the clusters in the first layer, that is, the cluster identified by cluster ID CL11, the cluster identified by cluster ID CL12, the cluster identified by cluster ID CL13, and the cluster identified by cluster ID CL14, are 0.0, 0.6, 0.8, and 0.0, respectively. The belonging weights of the music piece identified by music ID XYZ567 with respect to the clusters in the second layer, that is, the cluster identified by cluster ID CL21, the cluster identified by cluster ID CL22, the cluster identified by cluster ID CL23, and the cluster identified by cluster ID CL24, are 0.0, 0.0, 0.0, and 1.0, respectively.

The belonging weights of the music piece identified by music ID XYZ567 for the clusters in the third layer, that is, the cluster identified by cluster ID CL31, the cluster identified by cluster ID CL32, and the cluster identified by cluster ID CL33, are 1.0, 0.0, and 0.1, respectively. The belonging weights of the music piece identified by music ID XYZ567 for the clusters in the fourth layer, that is, the cluster identified by cluster ID CL41, the cluster identified by cluster ID CL42, the cluster identified by cluster ID CL43, and the cluster identified by cluster ID CL44, are 0.4, 0.0, 0.0, and 0.7, respectively.

For example, the similarity level determination unit 27 determines a similarity level sim(u, i) by carrying out the calculation given by Eq. (2) from the belonging weights for the preference values of the user with respect to the clusters and the belonging weights for the cluster information of the music piece identified by music ID i with respect to the clusters.

[Eq. 2]

$$sim(u, i) = \sum_{l \in L} \sum_{c \in C(l)} h_{ulc} w_{ilc} \quad (2)$$

In Eq. (2), L denotes the value indicating the number of layers, and l denotes the value identifying a layer. C(l) denotes the overall clusters, and c denotes the value identifying a cluster. $w_{ilc}$ denotes the belonging weight of the cluster information of the music piece identified by music ID i with respect to the c-th cluster in the l-th layer. $h_{ulc}$ denotes the belonging weight of the preference values of the user u with respect to the c-th cluster in the l-th layer.

FIG. 29 is a diagram showing an example of the similarity levels determined by the calculation given by Eq. (2) from the preference values representing the belonging weights for the clusters shown in FIG. 27 and the cluster information indicating the belonging weights for the clusters shown in FIG. 28.

For the belonging weights with respect to the first layer among the belonging weights of the preference values of the user identified by user ID U001, and the belonging weights with respect to the first layer among the belonging weights of the cluster information of the music piece identified by music ID ABC123, the associated belonging weights are multiplied, and the results of the multiplication are accumulated to obtain a value of 0.91, which is provided for the first layer with respect to music ID ABC123 shown in FIG. 29. Likewise, with respect to the second, third, and fourth layers, for the belonging weight of the preference values of the user identified by user ID U001 and the belonging weights of the cluster information of the music piece identified by music ID ABC123, the associated belonging weights are multiplied, and the results of the multiplication are accumulated to obtain values of 0.67, 0.53, and 0.00, which are provided for the second, third, and fourth layers with respect to music ID ABC123 shown in FIG. 29, respectively.

Finally, the similarity level between the preference values of the user identified by user ID U001 and the cluster information of the music piece identified by music ID ABC123 is 2.11, which is the sum of 0.91, 0.67, 0.53, and 0.00 determined for the first, second, third, and fourth layers, respectively.

For the belonging weights with respect to the first layer among the belonging weights of the preference values of the user identified by user ID U001, and the belonging weights with respect to the first layer among the belonging weights of the cluster information of the music piece identified by music ID CTH863, the associated belonging weights are multiplied, and the results of the multiplication are accumulated to obtain a value of 0.00, which is provided for the first layer with respect to music ID CTH863 shown in FIG. 29. Likewise, with respect to the second, third, and fourth layers, for the belonging weights of the preference values of the user identified by user ID U001 and the belonging weights of the cluster information of the music piece identified by music ID CTH863, the associated belonging weights are multiplied, and the results of the multiplication are accumulated to obtain values of 0.92, 0.82, and 0.63, which are provided for the second, third, and fourth layers with respect to music ID CTH863 shown in FIG. 29, respectively.

Finally, the similarity level between the preference values of the user identified by user ID U001 and the cluster information of the music piece identified by music ID CTH863 is 2.37, which is the sum of 0.00, 0.92, 0.82, and 0.63 determined for the first, second, third, and fourth layers, respectively.

For the belonging weights with respect to the first layer among the belonging weights of the preference values of the user identified by user ID U001, and the belonging weights with respect to the first layer among the belonging weights of the cluster information of the music piece identified by music ID XYZ567, the associated belonging weights are multiplied, and the results of the multiplication are accumulated to obtain a value of 0.44, which is provided for the first layer with respect to music ID XYZ567 shown in FIG. 29. Likewise, with respect to the second, third, and fourth layers, for the belonging weights of the preference values of the user identified by user ID U001 and the belonging weights of the cluster information of the music piece identified by music ID XYZ567, the associated belonging weights are multiplied, and the results of the multiplication are accumulated to obtain values of 0.00, 0.72, and 0.00 determined for the second, third, and fourth layers with respect to music ID XYZ567 shown in FIG. 29, respectively.

Finally, the similarity level between the preference values of the user identified by user ID U001 and the cluster information of the music piece identified by music ID XYZ567 is 1.15, which is the sum of 0.44, 0.00, 0.72, and 0.00 determined for the first, second, third, and fourth layers, respectively.

The similarity levels may be calculated using weights based on the distribution of the belonging weights of the preference values of the user in each of the layers.

For example, the similarity level determination unit 27 determines a similarity level sim(u, i) by calculating the calculation given by Eq. (3) from the belonging weights for the preference values of the user with respect to the clusters and the belonging weights for the cluster information of the music piece identified by music ID i with respect to the clusters.

[Eq. 3]

$$sim(u, i) = \sum_{l \in L} \sum_{c \in C(l)} b_{ul} h_{ulc} w_{ilc} \quad (3)$$

In Eq. (3), L denotes the value indicating the number of layers, and l denotes the value identifying a layer. C(l) denotes the overall clusters, and c denotes the value identifying a cluster. $w_{ilc}$ denotes the belonging weight of the cluster information of the music piece identified by music ID i with respect to the c-th cluster in the l-th layer. $h_{ulc}$ denotes the belonging weight of the preference values of the user u with respect to the c-th cluster in the l-th layer. $b_{ul}$ denotes the weight of the preference values of the user u with respect to the l-th layer.

FIG. 30 is a diagram showing an example of the weight for each of the layers, which is a distribution of the belonging weights of the preference values of the user for each of the layers. In the example shown in FIG. 30, the weights for the user identified by user ID U001 with respect to the first, second, third, and fourth layers are 0.17, 0.10, 0.01, and 0.06, respectively.

FIG. 31 is a diagram showing an example of the similarity levels determined by the calculation given by Eq. (3) from the preference values representing the belonging weights for the clusters shown in FIG. 27, the cluster information indicating the belonging weights for the clusters shown in FIG. 28, and the weights for the respective layers shown in FIG. 30. The similarity levels shown in FIG. 31 are 10 times the results obtained by the calculation given by Eq. (3).

The belonging weight of the preference values of the user identified by user ID U001 with respect to the first layer, the belonging weight of the cluster information of the music piece identified by music ID ABC123 with respect to the first layer, which corresponds to the belonging weight of the preference values of the user, and the weight for the first layer are multiplied, and the results of the multiplication are accumulated to obtain a value of 1.27, which is provided for the first layer with respect to music ID ABC123 shown in FIG. 31. Likewise, with respect to the second, third, and fourth layers, the belonging weight of the preference values of the user identified by user ID U001, the belonging weight of the cluster information of the music piece identified by music ID ABC123, which corresponds to the belonging weight of the preference values of the user, and the weight for the corresponding layer among the second, third, and fourth layers are multiplied, and the results of the multiplication are accumulated to obtain values of 0.49, 0.03, and 0.00, which are provided for the second, third, and fourth layers with respect to music ID ABC123 shown in FIG. 31, respectively.

Finally, the similarity level between the preference values of the user identified by user ID U001 and the cluster information of the music piece identified by music ID ABC123 is 1.79, which is the sum of 1.27, 0.49, 0.03, and 0.00 determined for the first, second, third, and fourth layers, respectively.

The belonging weight of the preference values of the user identified by user ID U001 with respect to the first layer, the belonging weight of the cluster information of the music piece identified by music ID CTH863 with respect to the first layer, which corresponds to the belonging weight of the preference values of the user, and the weight for the first layer are multiplied, and the results of the multiplication are accumulated to obtain a value of 0.00, which is provided for the first layer with respect to music ID CTH863 shown in FIG. 31. Likewise, with respect to the second, third, and fourth layers, the belonging weight of the preference values of the user identified by user ID U001, the belonging weight of the cluster information of the music piece identified by music ID CTH863, which corresponds to the belonging weight of the preference values of the user, and the weight for the corresponding layer among the second, third, and fourth layers are multiplied, and the results of the multiplication are accumulated to obtain values of 0.65, 0.04, and 0.27, which are provided for the second, third, and fourth layers with respect to music ID CTH863 shown in FIG. 31, respectively.

Finally, the similarity level between the preference values of the user identified by user ID U001 and the cluster information of the music piece identified by music ID CTH863 is 0.96, which is the sum of 0.00, 0.65, 0.04, and 0.27 determined for the first, second, third, and fourth layers, respectively.

The belonging weight of the preference values of the user identified by user ID U001 with respect to the first layer, the belonging weight of the cluster information of the music piece identified by music ID XYZ567 with respect to the first layer, which corresponds to the belonging weight of the preference values of the user, and the weight for the first layer are multiplied, and the results of the multiplication are accumulated to obtain a value of 0.53, which is provided for the first layer with respect to music ID XYZ567 shown in FIG. 31, Likewise, with respect to the second, third, and fourth layers, the belonging weight of the preference values of the user identified by user ID U001, the belonging weight of the cluster information of the music piece identified by music ID XYZ567, which corresponds to the belonging weight of the preference values of the user, and the weight for the corresponding layer among the second, third, and fourth layers are multiplied, and the results of the multiplication are accumulated to obtain values of 0.00, 0.04, and 0.00, which are provided for the second, third, and fourth layers with respect to music ID XYZ567 shown in FIG. 31, respectively.

Finally, the similarity level between the preference values of the user identified by user ID U001 and the cluster information of the music piece identified by music ID XYZ567 is 0.57, which is the sum of 0.53, 0.00, 0.04, and 0.00 determined for the first, second, third, and fourth layers, respectively.

Focusing on the preference values shown in FIG. 27, the values of the belonging weights of the preference values of the user identified by user ID U001 vary more largely in the first layer than in the second to fourth layers. It is therefore expected that the values of the elements of the first layer are closely related to the preferences of the user identified by user ID U001 more than the second to fourth layers.

By applying weights in this manner, the values that are expected to be more closely related to the preferences of the user can be used more than the values that are expected to be less closely related to the preferences of the user to thereby determine the similarity levels with which the values more largely vary. Therefore, a music piece desired by the user can more accurately be detected.

Referring back to FIG. 26, in step S272, the similarity level determination unit 27 sorts the music pieces in the set C in the order of higher similarity to the preferences of the user on the basis of the similarity levels.

More specifically, the similarity level determination unit 27 associates the similarity levels obtained as results of the calculation with the music IDs of the music pieces in the set C, and rearranges the music IDs of the music pieces in the set C on the basis of the similarity levels so that the music pieces in the set C can be sorted in the order of higher similarity to the preferences of the user.

In step S273, the similarity level determination unit 27 selects any number of high-order music pieces from among the sorted music pieces. The similarity level determination unit 27 supplies the music ID of the selected music piece to the selection reason generation unit 28.

For example, similarity levels are determined by the calculation given by Eq. (2) to thereby obtain a similarity level of 2.11 for the music piece identified by music ID ABC123, a similarity level of 2.37 for the music piece identified by music ID CTH863, and a similarity level of 1.15 for the music piece identified by music ID XYZ567. In this case, when one music piece is to be selected, the music piece identified by music ID CTH863 for which the similarity level is the maximum is selected.

Further, for example, similarity levels are determined by the calculation given by Eq. (3) using the weights based on the distribution of the belonging weights of the preference values of the user for each of the layers to thereby obtain a similarity level of 1.79 for the music piece identified by music ID ABC123, a similarity level of 0.96 for the music piece identified by music ID CTH863, and a similarity level of 0.57 for the music piece identified by music ID XYZ567. In this case, when one music piece is to be selected, the music piece identified by music ID ABC123 for which the similarity level is the maximum is selected.

In step S274, the selection reason generation unit 28 generates a selection reason statement indicating the reason for selection of the music piece selected by the similarity level determination unit 27, and outputs the selection reason statement together with the music ID of the selected music piece to the music providing unit 29. In step S275, the music providing unit 29 provides the user with the music piece of the music ID and the selection reason statement that are input from the selection reason generation unit 28. Then, the process ends.

Figure 32:
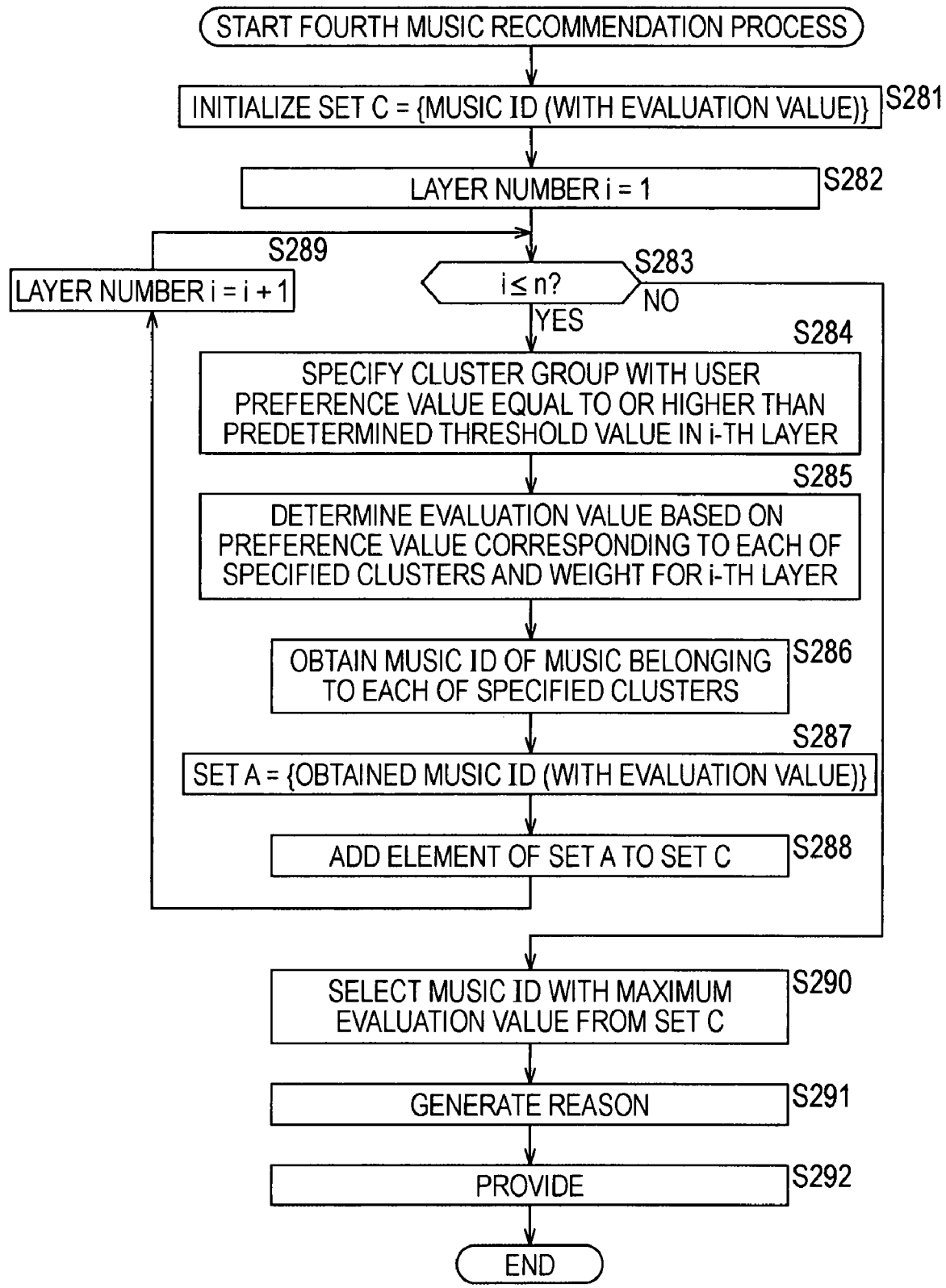
FIG. 32 is a flowchart showing a fourth music recommendation process.

Next, a fourth music recommendation process will be described with reference to a flowchart of FIG. 32. The processing of steps S281 to S284 is similar to the processing of steps S121 to S124 shown in FIG. 15, respectively, and a description thereof is thus omitted.

In step S285, the music extraction unit 23 determines an evaluation value on the basis of the preference value corresponding to each of the specified clusters and the weight for the i-th layer.

FIG. 33 is a diagram showing an example of preference values whose belonging weights are equal to or more than a threshold value of 0.6 among the belonging weights of the preference values shown in FIG. 27.

That is, in the belonging weights of the preference values shown in FIG. 27, the belonging weights less than 0.6 are replaced by 0.0 so that the preference values shown in FIG. 33 can be determined.

For example, the belonging weights of the preference values of the user identified by user ID U001 with respect to the clusters in the first layer, that is, the cluster identified by cluster ID CL11, the cluster identified by cluster ID CL12, the cluster identified by cluster ID CL13, and the cluster identified by cluster ID CL14, are 0.0, 0.8, 0.0, and 0.6, respectively. The belonging weights of the preference values of the user identified by user ID U001 with respect to the clusters in the second layer, that is, the cluster identified by cluster ID CL21, the cluster identified by cluster ID CL22, the cluster identified by cluster ID CL23, and the cluster identified by cluster ID CL24, are 0.0, 0.6, 0.7, and 0.0, respectively.

The belonging weights of the preference values of the user identified by user ID U001 with respect to the clusters in the third layer, that is, the cluster identified by cluster ID CL31, the cluster identified by cluster ID CL32, and the cluster identified by cluster ID CL33, are 0.7, 0.0, and 0.0, respectively. The belonging weights of the preference values of the user identified by user ID U001 with respect to the clusters in the fourth layer, that is, the cluster identified by cluster ID CL41, the cluster identified by cluster ID CL42, the cluster identified by cluster ID CL43, and the cluster identified by cluster ID CL44, are 0.0, 0.0, 0.0, and 0.0, respectively.

In step S285, for example, the music extraction unit 23 determines a similarity level by carrying out the calculation given by Eq. (3) from the belonging weights for the clusters with respect to the preference value for which the belonging weight is equal to or more than the threshold value and the belonging weights for the clusters with respect to the cluster information of the music piece identified by music ID i. That is, for example, the value to be multiplied by a belonging weight less than a threshold value of 0.6 in the initial belonging weights of the preference values is not added to the similarity level, and the value to be multiplied by a belonging weight equal to or more than the threshold value in the initial belonging weights of the preference values is added to the similarity level.

FIG. 34 is a diagram showing an example of the similarity levels determined by the calculation given by Eq. (3) from the preference values whose belonging weights are equal to or more than the threshold value shown in FIG. 33, the cluster information indicating the belonging weights for the clusters shown in FIG. 28, and the weights for the respective layers shown in FIG. 30.

The belonging weight of the preference values of the user identified by user ID U001 with respect to the first layer, which are the preference values whose belonging weights are equal to or more than the threshold value, the belonging weight of the cluster information of the music piece identified by music ID ABC123 with respect to the first layer, which corresponds to the belonging weight of the preference values of the user, and the weight for the first layer are multiplied, and the results of the multiplication are accumulated to obtain a value of 0.15, which is provided for the first layer with respect to music ID ABC123 shown in FIG. 34. Likewise, with respect to the second, third, and fourth layers, the belonging weight of the preference values of the user identified by user ID U001, which are the preference values whose belonging weights are equal to or more than the threshold value, the belonging weight of the cluster information of the music piece identified by music ID ABC123, which corresponds to the belonging weight of the preference values of the user, and the weight for the corresponding layer among the second, third, and fourth layers are multiplied, and the results of the multiplication are accumulated to obtain values of 0.05, 0.00, and 0.00, which are provided for the second, third, and fourth layers with respect to music ID ABC123 shown in FIG. 34, respectively.

Finally, the similarity level between the preference values of the user identified by user ID U001 and the cluster information of the music piece identified by music ID ABC123 is 0.20, which is the sum of 0.15, 0.05, 0.00, and 0.00 determined for the first, second, third, and fourth layers, respectively.

The belonging weight of the preference values of the user identified by user ID U001 with respect to the first layer, which are the preference values whose belonging weights are equal to or more than the threshold value, the belonging weight of the cluster information of the music piece identified by music ID CTH863 with respect to the first layer, which corresponds to the belonging weight of the preference values of the user, and the weight for the first layer are multiplied, and the results of the multiplication are accumulated to obtain a value of 0.00, which is provided for the first layer with respect to music ID CTH863 shown in FIG. 34. Likewise, with respect to the second, third, and fourth layers, the belonging weight of the preference values of the user identified by user ID U001, which are the preference values whose belonging weights are equal to or more than the threshold value, the belonging weight of the cluster information of the music piece identified by music ID CTH863, which corresponds to the belonging weight of the preference values of the user, and the weight for the corresponding layer among the second, third, and fourth layers are multiplied, and the results of the multiplication are accumulated to obtain values of 0.10, 0.00, and 0.00, which are provided for the second, third, and fourth layers with respect to music ID CTH863 shown in FIG. 34.

Finally, the similarity level between the preference values of the user identified by user ID U001 and the cluster information of the music piece identified by music ID CTH863 is 0.10, which is the sum of 0.00, 0.10, 0.00, and 0.00 determine for the first, second, third, and fourth layers, respectively.

The belonging weight of the preference values of the user identified by user ID U001 with respect to the first layer, which are the preference values whose belonging weights are equal to or more than the threshold value, the belonging weight of the cluster information of the music piece identified by music ID XYZ567 with respect to the first layer, which corresponds to the belonging weight of the preference values of the user, and the weight for the first layer are multiplied, and the results of the multiplication are accumulated to obtain a value of 0.07, which is provided for the first layer with respect to music ID XYZ567 shown in FIG. 34. Likewise, with respect to the second, third, and fourth layers, the belonging weight of the preference values of the user identified by user ID U001, which are the preference values whose belonging weights are equal to or more than the threshold value, the belonging weight of the cluster information of the music piece identified by music ID XYZ567, which corresponds to the belonging weight of the preference values of the user, and the weight for the corresponding layer among the second, third, and fourth layers are multiplied, and the results of the multiplication are accumulated to obtain values of 0.00, 0.00, and 0.00, which are provided for the second, third, and fourth layers with respect to music ID XYZ567 shown in FIG. 34, respectively.

Finally, the similarity level between the preference values of the user identified by user ID U001 and the cluster information of the music piece identified by music ID XYZ567 is 0.08, which is the sum of 0.07, 0.00, 0.00, and 0.00 determined for the first, second, third, and fourth layers, respectively.

The processing of steps S286 to S292 is similar to the processing of steps S126 to S132 shown in FIG. 15, respectively, and a description thereof is thus omitted.

While the foregoing description has been given in the context in which a weight that is a distribution of belonging weights belonging to each layer is used, the present invention is not limited thereto. In a case where belonging weights largely vary in a layer, a weight having a larger value may be calculated. For example, an entropy H may be determined by Eq. (4), and a weight that is a value obtained by subtracting the entropy H from 1 may be determined.

[Eq. 4]

$$H_{(l)} = \sum_{c \in C(l)} h_{lc} \log h_{lc} \qquad (4)$$

Therefore, the amount of calculation for selecting appropriate content can be reduced while minimizing the lack of the information. Further, content that reliably reflects what information the user is interested in to select content can be provided.

In this specification, steps to be executed according to the programs may include processes that are executed in sequence in the orders stated herein, and may also include processes that are executed in parallel or individually, not necessarily in sequence.

The programs may be processed by a single computer, or may be processed in a distributed manner by a plurality of computers. The programs may further be transferred to and executed by a remote computer.

In this specification, a system refers to the entirety of apparatuses constituted by a plurality of apparatuses.

The invention claimed is:

1. An information processing apparatus for selecting a content piece satisfying a predetermined condition, specified by a user, from a content group, the information processing apparatus comprising:
   a clustering unit for classifying each of content pieces constituting the content group into any of a plurality of first clusters in each of layers associated with items of metadata of the content pieces according to classification of the metadata by a distance measure for the metadata, the classification of the metadata being defined for each of the layers;
   a database indicating correspondences between the content pieces and the first clusters in the layers into which the content pieces are classified;
   a cluster mapping unit for specifying a first cluster corresponding to the predetermined condition for each of the layers from among the first clusters and specifying a content piece corresponding to the specified first cluster from among the content pieces; and a providing unit for providing, to the user, the specified content piece and a reason statement indicating the reason for specifying the content piece, wherein the reason statement is generated using text extracted from an existing review of the specified content piece, the extracted text having at least one word associated with a keyword of the specified first cluster.

2. The information processing apparatus according to claim 1, further comprising a storing unit for storing a preference value indicating a degree of preference of a user in association with each of the first clusters into which the content pieces are classified by the clustering unit,
wherein the cluster mapping unit specifies a first cluster from among the first clusters on the basis of the preference values stored by the storing means, and specifies a content piece corresponding to the specified first cluster from among the content pieces.

3. The information processing apparatus according to claim 2, wherein the cluster mapping unit further specifies from among the content pieces a content piece corresponding to the specified first cluster using an evaluation value indicating a degree of preference of the user with a weight for each of the layers in accordance with the preference value.

4. The information processing apparatus according to claim 1, wherein:
the content pieces are music pieces; and
the items of metadata include at least one of tempo, beat, and rhythm of the music pieces.

5. The information processing apparatus according to claim 1, wherein the items of metadata include review text for the corresponding content pieces.

6. The information processing apparatus according to claim 1, further comprising a metadata classifier for classifying each of the items of metadata with respect to the plurality of content pieces into any of a plurality of second clusters, and allocating the layers to the second clusters,
wherein the clustering unit classifies each of the content pieces into any of the plurality of first clusters for each of the allocated layers.

7. The information processing apparatus according to claim 1, wherein the cluster mapping unit further specifies a content piece using a similarity level indicating a degree of similarity to a similarity-reference content piece from among content pieces corresponding to a first cluster among the first clusters into which the similarity-reference content piece is classified.

8. The information processing apparatus according to claim 7, wherein the cluster mapping unit specifies a content piece using the similarity level that is weighted by a weight for each of the layers in accordance with a belonging weight of the similarity-reference content piece for the first cluster.

9. An information processing method for an information processing apparatus for selecting a content piece satisfying a predetermined condition, specified by a user, from a content group, the information processing method comprising:
classifying, by a clustering unit, each of content pieces constituting the content group into any of a plurality of clusters in each of layers associated with items of metadata of the content pieces according to classification of the metadata by a distance measurement of the metadata that is defined for each of the layers;
holding, by a cluster information database, a database indicating correspondences between the content pieces and the clusters in the layers into which the content pieces are classified;
specifying, by a cluster mapping unit, a cluster corresponding to the predetermined condition for each of the layers from among the clusters and specifying, by an extraction unit, a content piece corresponding to the specified cluster from among the content pieces; and
providing, by a providing unit, the specified content piece and a reason statement indicating the reason for specifying the content piece to the user, wherein the reason statement is generated using text extracted from an existing review of the specified content piece, the extracted text having at least one word associated with a keyword of the specified cluster.

10. A computer readable medium comprising executable instructions for selecting a content piece satisfying a predetermined condition, specified by a user, from a content group, the program causing a computer to execute a process comprising:
classifying, by a clustering unit, each of content pieces constituting the content group into any of a plurality of clusters in each of layers associated with items of metadata of the content pieces according to classification of the metadata by a distance measurement of the metadata that is defined for each of the layers;
holding, by a cluster information database, a database indicating correspondences between the content pieces and the clusters in the layers into which the content pieces are classified;
specifying, by a cluster mapping unit, a cluster corresponding to the predetermined condition for each of the layers from among the clusters and specifying, by an extraction unit, a content piece corresponding to the specified cluster from among the content pieces; and
providing, by a providing unit, the specified content piece and a reason statement indicating the reason for specifying the content piece to the user, wherein the reason statement is generated using text extracted from an existing review of the specified content piece, the extracted text having at least one word associated with a keyword of the specified cluster.

* * * * *